(12) United States Patent
Niessner et al.

(10) Patent No.: US 10,563,046 B2
(45) Date of Patent: Feb. 18, 2020

(54) TRANSLUCENT FIBRE COMPOSITE MATERIALS COMPRISING CHEMICALLY MODIFIED POLYMERS

(71) Applicant: INEOS STYROLUTION GROUP GMBH, Frankfurt am Main (DE)

(72) Inventors: Norbert Niessner, Friedelsheim (DE); Philipp Deitmerg, Schmallenberg (DE); Eike Jahnke, Aubonne (CH); Marko Blinzler, Mannheim (DE); Achim Bernhardt, Hainburg (DE); Tobias Schulz, Cologne (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 103 days.

(21) Appl. No.: 15/567,266

(22) PCT Filed: Apr. 22, 2016

(86) PCT No.: PCT/EP2016/058991
§ 371 (c)(1),
(2) Date: Oct. 17, 2017

(87) PCT Pub. No.: WO2016/170103
PCT Pub. Date: Oct. 27, 2016

(65) Prior Publication Data
US 2018/0094122 A1   Apr. 5, 2018

(30) Foreign Application Priority Data

Apr. 22, 2015 (DE) .................. 10 2015 207 372
Mar. 24, 2016 (EP) ..................... 16162362

(51) Int. Cl.
| | | |
|---|---|---|
| C08K 7/00 | (2006.01) | |
| C08K 7/14 | (2006.01) | |
| C08L 25/12 | (2006.01) | |
| C08L 25/14 | (2006.01) | |

(52) U.S. Cl.
CPC ............ C08K 7/14 (2013.01); C08L 25/12 (2013.01); C08L 25/14 (2013.01); C08L 2205/025 (2013.01); C08L 2207/04 (2013.01)

(58) Field of Classification Search
CPC ..... C08K 7/14; C08J 5/08; C08J 25/08; C08J 25/12; C08J 25/14; B32B 5/022; B32B 5/024; B32B 5/026; B32B 5/028; B32B 5/08; C08L 25/12; C08L 25/14; C08L 25/08
USPC ......................................................... 523/217
See application file for complete search history.

(56) References Cited

U.S. PATENT DOCUMENTS

| | | |
|---|---|---|
| 4,344,906 A | 8/1982 | Kitagawa et al. |
| 4,547,533 A | 10/1985 | Zabrocki et al. |
| 8,030,393 B2 | 10/2011 | Niessner et al. |
| 2011/0020572 A1 | 1/2011 | Malek et al. |
| 2012/0059109 A1 | 3/2012 | Weber et al. |
| 2013/0224470 A1* | 8/2013 | Vautard ............... C08J 5/06 428/300.1 |

FOREIGN PATENT DOCUMENTS

| | | |
|---|---|---|
| CN | 101555341 A | 10/2009 |
| CN | 102924857 A | 2/2013 |
| DE | 2160778 A1 | 6/1973 |
| DE | 3324909 A1 | 1/1985 |
| EP | 2251377 A1 | 11/2010 |
| KR | 20020054717 A | 7/2002 |
| WO | 2008/058971 A1 | 5/2008 |
| WO | 2008/110539 A1 | 9/2008 |
| WO | 2008/119678 A1 | 10/2008 |

* cited by examiner

*Primary Examiner* — Hannah J Pak
(74) *Attorney, Agent, or Firm* — J.A. Lindeman & Co. PLLC; Jeffrey Lindeman; Aaron Raphael

(57) ABSTRACT

The present invention relates to a fibre composite material W of increased translucency and/or mechanical strength, comprising a copolymer C encompassing monomers A-1, where A-1 form covalent bonds with functional groups B-1 on the surface of fibres B embedded in the fibre composite material W, and this fibre composite material W has greater translucency and/or mechanical strength than a fibre composite material W in which the copolymer C contains no A-1. The present invention further embraces a method for producing a fibre composite material W of increased translucency and/or mechanical strength.

11 Claims, 12 Drawing Sheets

TRANSLUCENT FIBRE COMPOSITE MATERIALS COMPRISING CHEMICALLY MODIFIED POLYMERS

Figure 1A:
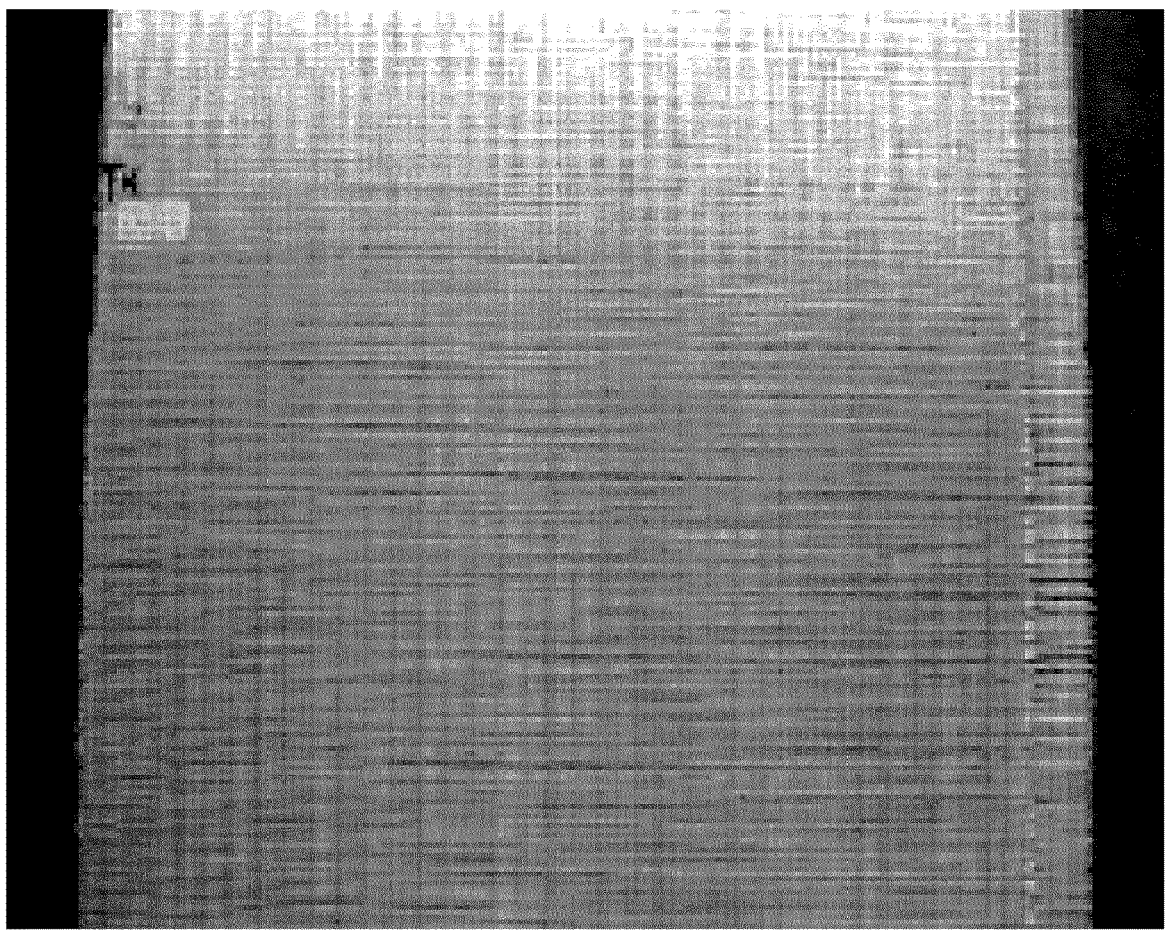

The present invention relates to a fiber composite material W having enhanced translucency and/or improved mechanical strength, which contains a copolymer C comprising monomers A-I, wherein A-I forms covalent bonds with functional groups B-I on the surface of fibers B embedded in said fiber composite material W, while said fiber composite material W displays higher translucency and/or improved mechanical strength over a corresponding fiber composite material W wherein said copolymer C (or C') contains no A-I (as building block). The present invention additionally encompasses a method of producing a fiber composite material W having enhanced translucency and/or improved mechanical strength.

Fiber composite materials (fiber composite engineering material, fiber-reinforced composite (engineering) materials or "organopanels") consist of numerous reinforcing fibers embedded into a polymer matrix. The areas of use for fiber composite materials vary widely. Vehicle construction and the aircraft industry is one area where fiber composite materials are used for example. Fiber composite materials there are intended to prevent the breaking apart or otherwise fragmenting of the matrix in order that the accident risk posed by vagabonding component part constituents may thereby be reduced. Many fiber composite materials are capable of absorbing comparatively high forces before failing. At the same time, fiber composite materials outperform conventional, unreinforced materials through a high level of strength and stiffness coupled at the same time with low density and further advantageous properties, for example a high level of resistance to aging and corrosion.

This strength and stiffness of fiber composite materials is conformable to the type and direction of loading. Here it is primarily the fibers which are responsible for the strength and stiffness of a fiber composite material. It is further also their arrangement which determines the mechanical properties of the particular fiber composite material. The matrix, by contrast, mostly has the primary purpose of distributing the applied forces onto the individual fibers and to maintain the spatial arrangement of the fibers in the desired orientation. Since not only the fibers but also the matrix materials allow for variation, numerous possible combinations of fibers and matrix materials come into consideration.

Continuous filament fiber composite materials are used to meet the highest expectations of the strength and stiffness of fiber composite materials.

Here it is only the final component part which limits the length of the fibers, which are imported in particular as wovens or noncrimp fabrics and to a high resultant fiber volume content. This results inside the component part or semi-finished product in a high degree of specific interfacial area between the fiber system and the matrix. In contradistinction to the impregnation of chopped fibers in injection molding processes, good impregnation of continuous filament fibers, wovens or noncrimp fabrics by the polymer matrix is often technically more challenging.

The bond between fiber and matrix also plays a significant part in the production of fiber composite materials. Similarly, the strength of the embedding of the fibers into the matrix (fiber-matrix adherence) may have appreciable influence on the properties of the fiber composite material.

To optimize the fiber-matrix adherence and to offset "low chemical similarity" between the fiber surfaces and the surrounding matrix of polymer, reinforcing fibers are generally pretreated. For this purpose, the so-called size generally has adhesion promoter added to it. Such a size is generally applied to the fiber during production in order to improve the further processability of the fibers (such as weaving, laying, stitching). In some cases, glass fibers are also processed without size.

Unwanted for the later stages of further processing, the size often further first has to be removed in an additional processing step, as for instance by singeing. A further adhesion promoter is then usually applied in an additional processing step to produce the fiber composite material. The size and/or the adhesion promoter form, on the surface of the fibers, a layer which may play a significant part in co-determining the interaction of the fibers with their surroundings. A multiplicity of different adhesion promoters are available today. The notional person skilled in the art will select, depending on the field of use, on the matrix to be used and on the fibers to be used, a suitable adhesion promoter, compatible with both the matrix and the fibers.

Its advantageous properties notwithstanding, even a fiber composite material may suffer a brittle fracture. Accordingly there are attempts in the prior art to provide fiber composite materials having a wide range of loading where total failure is most unlikely. Many applications, however, additionally demand good visual properties, such as the possibility of using the fiber composite material to obtain elements having smooth surfaces (a low level of surface waviness), decoratability and high transparency. These visual properties have hitherto been neglected with many fiber composite materials.

To wit, many fiber composite materials are comparatively untransparent and moreover display some undesirable surface waviness (texture) due to the heterogeneity of fibrous and matrix portions.

WO 2008/058971 describes molding compositions having comparatively good mechanical properties. However, two groups of reinforcing fibers having different properties are used therein, the groups of reinforcing fibers each being provided different adhesion promoter compositions, which give rise to the different fiber-matrix adherences. In addition, the reinforcing fibers have to be imported into the matrix in the form of complex networks. Such a procedure presupposes an undesirably complex and labor-intensive manufacturing process. Moreover, WO 2008/058971 does not teach the production of fiber composite materials having good visual properties such as smooth surfaces and high transparency. WO 2008/058971 also does not teach reinforcing the flexural strength through the constitution of the composite engineering materials.

WO 2008/119678 describes glass fiber reinforced polymer compositions improved in its mechanical properties by use of maleic anhydride-containing styrene copolymer. No pointers to fiber composite materials are provided, however. On the contrary, the use of chopped fibers is taught. What is not taught in particular is how fiber composite materials having good visual properties, such as smooth surfaces and high transparency, may be obtained.

CN102924857 describes mixtures of styrene-maleic anhydride copolymers which are mixed with chopped glass and display relatively high strengths. However, the stress cracking resistance of such a material to solvents is minimal and the strength is low by comparison with glass fiber composites. Nor is there any teaching as to how fiber composite materials having good visual properties such as smooth surfaces and high transparency, may be obtained.

CN101555341 describes mixtures formed from polymer compositions, glass fibers, maleic anhydride-containing polymers and epoxy resins. The compatibility with glass fibers here is comparatively good by virtue of the high proportion of epoxy groups, yet the flowability of such a mixture, comprising a (thermoset) epoxy resin, is very limited, which appreciably compromises the production of shaped articles, especially those having good visual properties, such as smooth surfaces and high transparency.

KR100376049 teaches mixtures formed from maleic anhydride- and N-phenylmaleimide-containing copolymer, glass fibers and an aminosilane-based coupling agent. The need to use such a coupling agent, however, is not desirable, since it represents an additional processing step and increases manufacturing costs.

Nor is any teaching provided as to how fiber composite materials having good visual properties, such as smooth surfaces and high transparency, may be obtained.

US 2011/0020572 describes organopanel component parts having a hybrid design from, for example, a highly flowable polycarbonate component. This polycarbonate (PC) is rendered flowable via suitable additives, as via hyperbranched polyesters, ethylene-(meth)acrylate copolymers or low molecular weight polyalkylene glycol esters.

DE-A 2 160 778 and EP-A 2 251 377 describe organopanels treated with an aminosilane size. The provision of particularly translucent organopanels is not taught.

(Glass) fibers in the prior art are frequently treated with a size, especially to protect the fibers from each other, i.e., to prevent their being damaged through attrition by mutual friction or crossfragmentation (breakage) due to mutual mechanical interaction.

A further function of the size is to facilitate the cutting of fibers, in particular to help achieve a consistent staple length. The size further serves to prevent any agglomeration of the fibers. The dispersibility of chopped fibers in water is improvable. It is thus possible to obtain uniform fabrics by the wet-laying process.

A size also helps to establish an improved coherence between the glass fibers and the polymer matrix in which the glass fibers act as reinforcing fibers. This principle finds application with the glassfiber-reinforced plastics (GRPs) especially.

Glass fiber sizes to date generally contain a large number of constituents, for example film-formers, lubricants, wetters and adhesion promoters. A film-former protects the glass filaments from mutual friction and is additionally capable of amplifying any affinity for synthetic resins and thus promotes the strength and coherence of a composite engineering material.

Starch derivatives, polymers and copolymer of vinyl acetate and acrylic esters, epoxy resin emulsions, polyurethane resins and polyamides at from 0.5 to 12 wt %, based on the entire size, are suitable.

A lubricant endows the glass fibers, and their products, with suppleness and reduces the mutual friction of the glass fibers, and also during production. Oftentimes, however, the adherence between glass and synthetic resin is compromised by the use of lubricants. Fats, oils and polyalkyleneamines at from 0.01 to 1 wt %, based on the entire size, are suitable.

A wetter lowers the surface tension and improves the wetting of the filaments with the size. Poly fatty acid amides for example are suitable for aqueous sizes at from 0.1 to 1.5 wt %, based on the entire size.

Suitable affinity between the polymer matrix and the glass fibers is often nonexistent. Adhesion promoters are capable of performing this bridging function by promoting the adhesion of polymers to the fiber surface. Most organofunctional silanes are suitable, examples being aminopropyltriethoxysilane, methacryloyloxypropyltrimethoxysilane, glycidyloxypropyltrimethoxysilane and the like.

Silanes added to an aqueous size are usually hydrolyzed into silanols. These silanols are then capable of reacting with reactive (glass) fiber surfaces to thus form an adhesion-promoting layer (having a thickness of about 3 nm).

Low molecular weight functional agents can accordingly react with silanol groups on the glass surface where these low molecular weight agents subsequently react further (in epoxy resins for example), creating a chemical form of attachment of the glass fiber to the polymer matrix. Such a production process, however, is time consuming in that complete curing of the polymers (the abovementioned epoxy resins for example) takes approximately between 30 minutes to more than an hour.

It accordingly appears to be desirable to have an improved process where already polymerized melts are brought into contact with glass fibers or other reinforcing fibers.

A functionalization by reaction with polymers is likewise known. It is thus possible, by using low molecular weight polycarbonate types, to efficiently impregnate the woven or noncrimp glass fiber fabric and, by reaction of functional groups on the glass fiber surface with the polycarbonate, to carry out a "graft" which increases the compatibility for the polymer. However, this procedure has the disadvantage that polycarbonate (PC) has a very high viscosity and this impregnating step necessitates the use of low molecular weight, i.e., low-viscosity, PC, which has an extremely poor fitness for purpose, for example a low resistance to stress-cracking agents, such as polar solvents.

In view of the prior art, one technical problem addressed by the present invention is that of providing a readily processable composite engineering material that is substantially inert to a multiplicity of solvents, readily stress cracking resistant and (flexurally) strong and which ideally also displays good visual properties, such as smooth surfaces and high transparency. The fiber composite material ideally eschews any adhesion promoter.

We have found that, surprisingly, the use of a copolymer C, which contains a monomer A-I covalently linked to functional groups B-I on the surface of the fibers B, leads to a fiber composite material W having the desired properties. The fiber composite material W obtained displays strength and is stress cracking and solvent resistant.

It is further possible to produce smooth surfaces and component parts having high transparency therefrom. Adhesion promoters may optionally be omitted.

In a first aspect, the present invention provides a fiber composite material W comprising (or consisting of):
(A) a polymer matrix in the form of a thermoplastic polymer composition A comprising (or consisting of):
  (A1) at least one copolymer C comprising monomers A-I and monomers A-II and optionally further monomers;
  (A2) optionally one or more dyes F; and
  (A3) optionally one or more assistants H; and
(B) fibers B whose surface displays functional groups B-I which form a covalent bond with said monomers A-I, but not with said monomers A-II,
wherein the light transmission through said fiber composite material W is not less than 10% higher than with a comparable fiber composite material W where monomers A-II fully replace said monomers A-I.

Optionally the flexural strength of said fiber composite material W here may be not less than 20% higher than with a comparable fiber composite material W where monomers A-II fully replace said monomers A-I.

As used herein, the flexural strength of fiber composite materials is generally determined in accordance with the standard method ISO 14125 (DIN EN ISO 14125:2011-05), whereto the recited values actually also refer. Alternatively, flexural strength is also quantifiable as per other standard methods such as, for instance, ASTM D790 Version 15e2 or ISO 178 (DIN EN ISO 178:2013-09).

Optionally, the surface waviness of fiber composite material W, which depends on the thermal expansion and distribution of the individual components, may—additionally or alternatively—be low. The thermal expansion of fiber component B is thus preferably in the range from 0 to $5 \cdot 10^{-6}$/K and therefore is preferably lower than with the matrix without fiber reinforcement, which on cooling down from the processing temperature to the service temperature undergoes a significant degree of volume reduction (thermal shrinkage plus crystallization/phase transition). It is thus not the thermal expansion of the composite material itself which plays a (principal) part in the formation of surface waviness, but solely the difference in the expansion (the shrinkage on cooling) of fiber component B (for example $<10 \cdot 10^{-6}$/K, preferably from 0 to $5 \cdot 10^{-6}$/K) versus the polymer matrix component comprising a thermoplastic polymer composition A, even with a simultaneously changing distribution of A and B in the cross section.

In one preferred embodiment, the melt volume rate (MVR) of thermoplastic polymer composition A used as polymer matrix is in the range from 10 to 70 cm$^3$/10 min, preferably in the range from 12 to 70 cm$^3$/10 min, especially in the range from 15 to 55 cm$^3$/10 min at 220° C./10 kg (measured to ISO1133, preferably in the most up to date version at the filing date).

In a particularly preferred embodiment, the melt volume rate (MVR) of thermoplastic polymer composition A used as polymer matrix is in the range from 10 to 35 cm$^3$/10 min, preferably in the range from 12 to 30 cm$^3$/10 min, especially in the range from 15 to 25 cm$^3$/10 min at 220° C./10 kg (measured to ISO1133, preferably in the most up to date version at the filing date).

Alternatively the melt volume rate (MVR) of thermoplastic polymer composition A used as polymer matrix is in the range from 35 to 70 cm$^3$/10 min, preferably in the range from 40 to 60 cm$^3$/10 min, especially in the range from 45 to 55 cm$^3$/10 min at 220° C./10 kg (measured to ISO1133, preferably in the most up to date version at the filing date).

Alternatively or additionally, the viscosity number ($J=(\eta/\eta_0 -1) \cdot 1/c$) determined using a capillary viscometer for the thermoplastic polymer composition A used as polymer matrix, when measured at room temperature (20° C.) for pellet material dissolved in dimethylformamide, may be 50 to 100 ml/g, preferably 55 to 85 ml/g. In one preferred embodiment, the viscosity number is in the range from 55 to 75 ml/g, preferably in the range from 60 to 70 ml/g and especially in the range from 61 to 67 ml/g. In an alternative preferred embodiment, the viscosity number is in the range from 60 to 90 ml/g, preferably in the range from 65 to 85 ml/g and especially in the range from 75 to 85 ml/g.

The notional person skilled in the art knows numerous ways to determine the surface waviness. For instance, the surface can be redrawn using laser scanning and then measured out for the height difference between wave maxima and minima.

A low level of surface waviness is to be understood as meaning central, in the broadest sense, total waviness profile heights of below 30 µm on the surface of fiber composite material W. A low level of surface waviness is preferably to be understood as meaning central, in the broadest sense, total waviness profile heights of below 15 µm, more preferably below 10 µm, especially below 7 µm, on the surface of fiber composite material W.

The present invention also provides a fiber composite material W comprising (or consisting of):
(A) a polymer matrix in the form of a thermoplastic polymer composition A comprising (or consisting of):
 (A1) at least one copolymer C comprising monomers A-I and monomers A-II and optionally further monomers;
 (A2) optionally one or more dyes F; and
 (A3) optionally one or more assistants H; and
(B) fibers B whose surfaces display functional groups B-I which form a covalent bond with said monomers A-I, but not with said monomers A-II,
wherein the flexural strength of said fiber composite material W is not less than 20% higher than with a comparable fiber composite material W where monomers A-II fully replace said monomers A-I.

Here optionally the light transmission through said fiber composite material W may be not less than 10% higher than with a comparable fiber composite material W where monomers A-II fully replace said monomers A-I.

In one preferred embodiment, the present invention provides a fiber composite material W comprising (or consisting of):
(A) a polymer matrix in the form of a thermoplastic polymer composition A comprising (or consisting of):
 (A1) at least one copolymer C comprising monomers A-I and monomers A-II and optionally further monomers;
 (A2) optionally one or more dyes F; and
 (A3) optionally one or more assistants H; and
(B) fibers B whose surfaces display functional groups B-I which form a covalent bond with said monomers A-I, but not with said monomers A-II,
wherein the light transmission through said fiber composite material W is not less than 10% higher than with a comparable fiber composite material W where monomers A-II fully replace said monomers A-I, and wherein the flexural strength of said fiber composite material W is not less than 20% higher than with a comparable fiber composite material W where monomers A-II fully replace said monomers A-I.

The present invention also provides a a fiber composite material W comprising (or consisting of):
(A) a polymer matrix in the form of a thermoplastic polymer composition A comprising (or consisting of):
 (A1) at least one copolymer C comprising monomers A-I and monomers A-II and optionally further monomers;
 (A2) optionally one or more dyes F; and
 (A3) optionally one or more assistants H; and
(B) fibers B whose surfaces display functional groups B-I which form a covalent bond with said monomers A-I, but not with said monomers A-II,
wherein the surface waviness is low. This means that the central total waviness profile heights are below 30 µm, preferably below 15 µm, more preferably below 10 µm, more preferably below 8 µm and especially below 7 µm on the surface of said fiber composite material W.

Here the light transmission through said fiber composite material W may optionally be not less than 10% higher than with a comparable fiber composite material W where monomers A-II fully replace said monomers A-I, and/or
the flexural strength of said fiber composite material W can be not less than 20% higher than with a comparable fiber composite material W where monomers A-II fully replace said monomers A-I.

The polymer matrix may accordingly be a matrix formed from amorphous plastic and embedding fibers B as reinforcing fibers and coupling them via a fiber-matrix adherence to the matrix. In the present invention, fiber composite material W includes the A and B components described above. Fibers B (reinforcing fibers) are accordingly embedded in a thermoplastic polymer composition A.

Light transmission as used herein is to be understood in its broadest sense. The notional person skilled in the art will recognize that said light transmission, as experimentally shown, concerns particularly the transmission of white daylight (often also referred to as (day)light-white or achromatic light). So light transmission as used herein is preferably the transmission of light at a color temperature of 5000 to 7000 kelvins (K), more preferably a color temperature of 5000 to 6700 K, yet more preferably at a color temperature of 5300 to 6500 K and especially at a color temperature of (about) 5500 K.

The white daylight in question will, in a particularly preferred embodiment, be produced using a lamp conforming to DIN EN 12464 (such as DIN EN 12464-1:2011) Alternatively, the daylight in question may be sunlight or produced using some other appropriate lamp.

For instance, the transparency in question may be measured on 1 mm thick samples of fiber composite material W as per ASTM D 1003 (such as ASTM D 1003-13) (as for instance by means of a transparency-measuring instrument (such as Byk Haze gard i (BYK-Gardner, USA)).

The spectrum of the wavelengths of the light whose transmission has been determined follows straightaway from the color temperature, especially when using daylight and/or daylight-type lamps. The light transmission in question more preferably concerns the transmission of light having a wavelength spectrum from (about) 280 to 800 nm, especially 400 nm to 800 nm (visible daylight), wherein the entirety of light constitutes white light within the meaning of daylight. Here it is the case that preferably not less than 50%, more preferably not less than 60%, yet more preferably not less than 75% and especially not less than 90% of the energy of the light derives from photons of the wavelength range between 280 and 800 nm. In summary, the light transmission in question concerns with particular preference the transmission of light having a color temperature of (about) 5500 K subject to the proviso that not less than 50%, especially not less than 90% of the energy of the light is attributable to photons of the wavelength range between 400 and 800 nm.

By way of example, the light transmission in question may be measured, and thus more particularly understood, as the transmission of light having the wavelength 400-450 nm, 425-475 nm, 450-500 nm, 475-525 nm, 500-550 nm, 525-575 nm, 550-600 nm, 575-625 nm, 600-650 nm, 625-675 nm, 650-700 nm, 675-725 nm, 700-750 nm, 725-775 nm or 750-800 nm.

Under Beer-Lambert's law, the thickness of fiber composite material W does not play any (significant) part in a comparative determination of the percentage degree of light transmission. The determination/measurement may preferably be carried out on fiber composite materials W ("organopanels") having a thickness of 0.1 to 10 mm, more preferable at from 0.2 to 5 mm, yet more preferable at from 0.5 to 2 mm and especially at (about) 1 mm.

In one preferred embodiment, fiber composite material W is a (substantially) flat (planar or surface-structured, sheet-like) organopanel from 0.1 to 10 mm, preferably from 0.2 to 5 mm, yet more preferably from 0.5 to 2 mm and especially (about) 1 mm in thickness. Alternatively, fiber composite material W is also usable in the production of thicker shaped articles.

Fiber composite material W and especially polymer composition A are preferably free from any dye(s) absorbing in the range from 400 to 800 nm which lead to an absorption of above 10%, above 20%, above 50%, above 75% or above 90% of daylight in such a fiber composite material W having a thickness of 1 mm. It will be understood that a comparable fiber composite material W having a higher absorption also contains a comparable, especially the same, proportion of dye(s) as a fiber composite material W that is in accordance with the present invention.

It was determined that fiber composite material W may optionally also contain one or more nontransparent components. For example, fiber composite material W may optionally contain color pigments (e.g., carbon black), rubber particles (e.g., graft rubbers (e.g., polybutadiene- and/or (meth)acrylate-based graft rubbers such as, for instance, acylonitrile-butadiene-styrene-copolymer (ABS)), (meth)acrylic ester-styrene-acrylonitrile copolymer (ASA) etc.)) and/or metal particles.

In this case, too, positive technical properties of fiber composite material W according to the present invention are maintained. Thus, the flexural strength for instance is preferably not less than 20% higher than with a comparable fiber composite material W where monomers A-II fully replace monomers A-I.

In addition, surface waviness may be low and the surface smooth as desired.

Moreover, a fiber composite material W, even when not transparent in its entirety, may have positive visual properties, say regarding its surface shine and the visibility of embedded elements. It is generally desired for instance that embedded particles of metal be visible and able to exhibit a metallic shine in the material. For instance, particles of aluminum or of gold may be used with the intention that they remain visible to the naked eye.

Transparency is optionally measured in accordance with DIN 55988 (such as DIN 55988:2013-04) on a workpiece 1 mm in diameter.

In one preferred embodiment, fiber composite material W consists (substantially) of:
(A) a polymer matrix in the form of a thermoplastic polymer composition A comprising (or consisting of):
   (A1) at least one copolymer C comprising monomers A-I and monomers A-II and optionally further monomers;
   (A2) optionally one or more dyes F; and
   (A3) optionally one or more assistants H; and
(B) fibers B whose surfaces display functional groups B-I which form a covalent bond with said monomers A-I, but not with said monomers A-II,
wherein the light transmission through said fiber composite material W is not less than 10% higher than with a comparable fiber composite material W where monomers A-II fully replace said monomers A-I.
wherein the light transmission through said fiber composite material W is not less than 10% higher than with a comparable fiber composite material W where monomers A-II fully replace said monomers A-I.

In addition to or in lieu of the increased degree of light transmission, the flexural strength of fiber composite material W in this embodiment may moreover be not less than 20% higher than with a comparable fiber composite material W where monomers A-II fully replace monomers A-I.

In one preferred embodiment, fiber composite material W consists of:
20-99.5 wt % of thermoplastic polymer composition A;
0.5-80 wt % of fibers B; and
0-79.5 wt % of further polymers D.

It will be understood that the monomers comprised by copolymer C (hence monomers A-I, monomers A-II and optionally further monomers) have been covalently bonded into the polymeric structure of copolymer C. The copolymer will typically be constructed of these monomers. A person skilled in the art will understand that the monomers referred to are therefore the monomeric building elements of copolymer C (hence monomer moieties bonded into the polymer structure). In line with the linguistic simplification practiced in the technical field of polymer chemistry, such monomeric building elements of a polymer are herein referred to as monomers even when they have become bonded into a polymer.

Similarly, monomers A-I continue to represent such when they have become bonded into the polymeric structure of copolymer C and, at the same time, form bonds with the functional groups B-I of fibers B.

It will similarly be understood that, once they have reacted with monomers A-I, said functional groups B-I displayed by fibers B have a chemical character other than that of unbonded functional groups B-I. When, for instance, the unbonded functional groups B-I represent hydroxyl groups (—OH), the bonded functional groups B-I may be hydroxyl group descendants, such as each being part of an ester group (—O—CO—). The notional person skilled in the art will understand that these reacted functional groups are herein also understood as functional groups B-I. It will further be understood that in the eventuality of complete bonding of functional groups B-I to said monomers A-I, no unbonded functional groups B-I will be present any longer.

Component A (Polymer Matrix Ex Thermoplastic Polymer Composition A)

Qualifying as being in accordance with the present invention, a fiber composite material W may comprise, as thermoplastic polymer composition A, any plastics that contain a copolymer C, especially those already known for the production of fiber composite materials.

Here an amorphous copolymer is preferably used as copolymer C. Copolymer C is therefore preferably devoid of (substantially) any crystalline structures. Copolymer C further preferably has a low level of melt viscosity. Preferably, thermoplastic polymer composition A as a whole has amorphous properties (hence (substantially) no crystallization). More preferably, copolymer C is an amorphous thermoplastic copolymer. Preferably, thermoplastic polymer composition A as a whole has amorphous, thermoplastic properties, hence is meltable and (substantially) noncrystalline. As a result, the shrinkage of thermoplastic polymer composition A, and hence also that of fiber composite material W as a whole, is comparatively low and it is possible to obtain particularly smooth surfaces.

Alternatively, thermoplastic polymer composition A may also contain partly crystalline engineering materials. Partly crystalline copolymers are accordingly useful as copolymer C for instance. In that case, thermoplastic polymer composition A may generally be a blend of amorphous thermoplastic polymers and partly crystalline polymers. Thermoplastic polymer composition A may for instance be a blend comprising one or more polycarbonates and/or one or more partly crystalline polymers (such as polyamide), although the proportion of component A as a whole which is attributable to partly crystalline blending components should be less than 50 wt %.

In the present invention, thermoplastic polymer composition A contains at least one copolymer C comprising monomers A-I which form a covalent bond with the functional groups B-I of the embedded fibers B. The proportion of monomers A-I in thermoplastic polymer composition A may be varied. The higher the proportion of monomers A-I and the functional groups B-I, the greater in general the bond between thermoplastic polymer composition A and fibers B, subject to the proviso that every case has an optimum whose exceedance will make the composites more brittle again.

In one preferred embodiment, said copolymer C has a constitution comprising not less than 0.1 wt %, preferably not less than 0.5 wt % and especially not less than 1 wt % of monomers A-I.

In the present invention, thermoplastic polymer composition A (component A), in addition to a copolymer C, may optionally contain further constituents, such as one or more further (co)polymers D, one or more dyes F and/or one or more assistants H. The proportion therein of copolymer C may vary. Preferably, however, thermoplastic polymer composition A consists mainly (hence to more than 25% or more than 50%) of copolymer C.

The extent to which thermoplastic polymer composition A consists of copolymer C is preferably not less than 50 wt %, preferably not less than 75 wt % and especially not less than 90 wt %.

In one particularly preferred embodiment, said thermoplastic polymer composition A comprises not less than 90 wt %, preferably not less than 95 wt % and especially not less than 98 wt % of said copolymer C.

Monomers A-I, capable of forming covalent bonds with the functional groups B-I of fibers B, may be any monomers that have such properties. The preference here for monomers A-I goes to those capable of forming covalent bonds by reaction with hydroxyl or amino groups. Monomers A-I preferably have:

(a) at least one functionality capable of forming covalent bonds with the functional groups B-I on the surface of fibers B (as for instance by reaction with hydroxyl and/or amino groups); and (b) at least one second functionality capable of becoming bound into copolymer C (e.g., a (more preferably terminal) double bond becoming bound into copolymer C by free-radical polymerization).

It is optionally also possible for copolymer C or else some other (co)polymer present in thermoplastic polymer composition C to contain one or more further monomers capable of forming covalent or noncovalent bonds with fibers B.

In one preferred embodiment, said monomers A-I are selected from the group consisting of maleic anhydride (MA), N-phenylmaleimide (PM), tert-butyl (meth)acrylate and glycidyl (meth)acrylate (GM), more preferably selected from the group consisting of maleic anhydride (MA), N-phenylmaleimide (PM) and glycidyl (meth)acrylate (GM).

Copolymer C may be any desired copolymer that includes monomers A-I and further monomers A-II.

In one preferred embodiment, copolymer C is a styrene copolymer C, comprising styrene (S) as monomers A-II.

Copolymer C is more preferably a copolymer which in addition to monomers A-I further comprises styrene (S) as monomers A-II and acrylonitrile (AN) as monomers A-III. So a styrene-acrylonitrile copolymer (SAN copolymer) is concerned in that case. Styrene-maleic anhydride copolymer is a further particularly preferred copolymer C.

Alternatively, copolymer C may be a copolymer which in addition to monomers A-I further comprises alpha-methylstyrene (AMS) (as monomers A-II) and acrylonitrile (AN) (as monomers A-III). So an alpha-methylstyrene-acrylonitrile copolymer (AMSAN copolymer) is concerned in that case. Alternatively, copolymer C may be an impact-modified styrene-acrylonitrile copolymer which in addition to styrene (S) (as monomers A-II) and acrylonitrile (AN) (as monomers A-III) further comprises butadiene as monomers A-IV. So an acrylonitrile-butadiene-styrene copolymer (ABS copolymer) is concerned in that case. Alternatively, copolymer C may be an impact-modified styrene-acrylonitrile copolymer which in addition to alpha-methylstyrene AMS (as monomers A-II) and acrylonitrile (AN) (as monomers A-III) further comprises butadiene as monomers A-IV. So an acrylonitrile-butadiene-styrene copolymer (MABS copolymer) is concerned in that case. Alternatively, copolymer C may be an impact-modified styrene-acrylonitrile copolymer which in addition to styrene (S) (as monomers A-II) and acrylonitrile (AN) (as monomers A-III) further comprises (meth)acrylate as monomers A-IV. So an acrylate-styrene-acrylonitrile copolymer (ASA copolymer) is concerned in that case. Thermoplastic polymer composition A may also contain block (co)polymers such as, for instance, styrene-butadiene block copolymers (e.g., Styrolux, Styroflex, K-Resin, Clearen, Asaprene) or even consist (substantially) of these. So copolymer C to be used for the purposes of the present invention may also be such a block (co)polymer in that case. Thermoplastic polymer composition A may optionally further comprise polycarbonates, amorphous polyesters and/or amorphous polyamides.

Thermoplastic polymer composition A preferably comprises not less than 95 wt % of copolymer C, especially wherein copolymer C is a styrene copolymer.

More preferably, thermoplastic polymer composition A comprises not less than 95 wt % of copolymer C, the latter comprising:
maleic anhydride (MA) as monomers A-I,
styrene (S) as monomers A-II, and
acrylonitrile (AN) as monomers A-III.

In a much preferred embodiment, thermoplastic polymer composition A comprises:
0.1-5 wt % of maleic anhydride (MA) as monomers A-I,
50-99.9 wt % of styrene (S) as monomers A-II, and
0-49.9 wt % of acrylonitrile (AN) as monomers A-III.
Styrene copolymer C more preferably consists of:
0.1-5 wt % of maleic anhydride (MA) as monomers A-I,
65-85 wt % of styrene (S) as monomers A-II,
10-34.9 wt % of acrylonitrile (AN) as monomers A-III.
Thus, for example styrene copolymer C may consist of:
0.1-5 wt % maleic anhydride (MA) as monomers A-I,
70-80 wt % of styrene (S) as monomers A-II, and
15-29.9 wt % of acrylonitrile (AN) as monomers A-III.
More preferably, styrene copolymer C consists of:
0.1-5 wt % of maleic anhydride (MA) as monomers A-I,
70-80 wt % of styrene (S) as monomers A-II, and
15-29.9 wt % of acrylonitrile (AN) as monomers A-III.
For example, thermoplastic polymer composition A may comprise not less than 95 wt % of copolymer C, the latter consisting of:
0.1-1 wt % maleic anhydride (MA) as monomers A-I,
74-74.9 wt % of styrene (S) as monomers A-II,
25 wt % of acrylonitrile (AN) as nonomers A-III.
Component B (Fibers B)

The fibers may be any fibers whose surface displays functional groups B-I which form a covalent bond with monomers A-I but not with monomers A-II.

In one preferred embodiment, functional groups B-I on the surface of fiber B are selected from silane groups.

In a further preferred embodiment, functional groups B-I at the surface of fibers B are selected from hydroxyl, ester and amino groups.

Hydroxyl groups are particularly preferred.

In a more preferred embodiment, fibers B are glass fibers displaying hydroxyl groups in the form of silanol groups as functional groups B-I on the surface.

Fibers B may alternatively also be aramid fibers, carbon fibers, metal fibers, basalt fibers and any forms thereof (e.g., as yarns, threads, rovings, mats, webs, wovens, noncrimp fabrics or knitted fabrics). Mixtures between two or more different species of fiber are also encompassed by the present invention. Using two, three or more groups of fibers B having different fiber-matrix adherences is a way to further influence the behavior of the fiber composite material in a precise and individual manner.

Fibers B may be embedded in fiber composite material W in any desired orientation and arrangement.

Fibers B are preferably in the form of wovens or noncrimp fabrics and, in either case, as continuous filament fibers (including fibers which are the product of single or individual fiber twisting). Fibers B therefore are preferably not chopped fibers and fiber composite material W is preferably not a chopped glass fiber-reinforced engineering material. Not less than 50% of fibers B therein are preferably not less than 5 mm, more preferably not less than 10 mm or more than 100 mm in length. The length of fibers B also depends on the size of shaped article T produced from said fiber composite material W.

In one preferred embodiment, said fibers B embed into said fiber composite material W layerwise, preferably as woven or noncrimp fabrics, especially as wovens.

Wovens and noncrimp fabrics herein, in line with the prevailing view, are to be understood as substantially interchangeable (preferably bidirectional) fabrics wherein fibers B are disposed into (preferably two) different spatial directions (preferably at a 90° angle ±20% to each other). A fabric thus formed may for the purposes of the invention also be referred to as a mat.

The notional person skilled in the art knows that a woven or noncrimp fabric differs from chopped fibers, since the coherent, comparatively large fibrous constructs (i.e., fabrics) formed with the former will generally be longer than 5 mm. The notional person skilled in the art further knows that the woven or noncrimp fabrics here are preferably disposed such that they extend (substantially) throughout said fiber composite material W. The woven or noncrimp fabrics are therefore preferably disposed such that they extend (substantially) throughout shaped article T consisting of said fiber composite material W. "Extend substantially throughout" here is to be understood as meaning that the woven or noncrimp fabrics and/or continuous filament fibers extend throughout the length of shaped article T to an extent of more than 50%, preferably not less than 70%, especially not less than 90%. What is referred to here as the length of shaped article T is the largest extent of shaped article T in one of the three spatial directions. More preferably, the woven or noncrimp fabrics and/or continuous filament fibers extend throughout the area of shaped article T to an extent of more than 50%, preferably not less than 70%, especially not less than 90%. What is referred to herein as the area of shaped article T is the area of the largest extent of shaped article T in two of the three spatial directions. Shaped article T is preferably a (substantially) flat-shaped article T.

That is, fibers B are preferably present in fiber composite material W not in (an entirely) uniformly random distribution, but in planes featuring a comparatively high proportion and planes featuring a comparatively low proportion (hence as more or less separate plies). The constitution of fiber composite material W may therefore also be referred to as laminatelike or laminar. Fibers B may have any desired orientation or may for instance take the form of wovens, mats, webs, noncrimp fabrics or knitted fabrics. Flat laminates thus formed contain layerwise constituted composites from flat reinforcing plies (ex fibers B) and plies of polymer matrix (ex thermoplastic polymer composition A) wetting and cohering same.

A layerwise form of embedment is particularly efficient to actualize in that case, since a layer thus configured is importable as a fibrous layer into thermoplastic molding composition A when the latter has (substantially) melted. Fibers B are preferably embedded in fiber composite material W in the form of a woven or noncrimp fabric, especially as a woven fabric. C Component D (Polymer D)

Polymer D may be any desired (co)polymer other than polymer composition A. Polymer D may optionally also be crosslinked. Polymer D therefore preferably is any desired (co)polymer not comprising monomer A-I. It will be understood that polymer D may be one type of polymer, but may also encompass two or more different types of polymer. Polymer D is preferably a thermoplastic polymer. Polymer D is preferably miscible with polymer composition A. Polymer D is preferably compatible with fibers B. Polymer D may for example be selected from the group consisting of polystyrene, poly(meth)acrylate, polycarbonate, styrene-acrylonitrile copolymer (SAN), acrylonitrile-butadiene-styrene copolymer (ABS), acrylonitrile-styrene-acrylate copolymer (ASA), polylactide (PLA), polylactide-co-glycolide (PLGA), a polyester, polyoxymethylene, polyethylene, polypropylene, polyvinyl chloride (PVC), polyethylene terephthalate (PET), polybutylene terephthalate (PBT) and polyamide.

Fiber Composite Material W

Said fiber composite material W preferably comprises:
(A) a polymer matrix in the form of a thermoplastic polymer composition A comprising:
  (A1) at least one copolymer C constructed from monomers A-I at not less than 0.1 wt %, plus monomers A-II and optionally further monomers, wherein said monomers A-I are selected from the group consisting of maleic anhydride (MA), N-phenylmaleimide (PM), tert-butyl (meth)acrylate and glycidyl (meth)acrylate (GM);
  (A2) optionally one or more dyes F; and
  (A3) optionally one or more assistants H; and
(B) fibers B whose surface displays hydroxyl, ester and/or amino groups as functional groups B-I which form a covalent bond with said monomers A-I, but not with said monomers A-II,
wherein the light transmission through said fiber composite material W is not less than 10% higher than with a comparable fiber composite material W where monomers A-II fully replace said monomers A-I.

In addition to or in lieu of the increased degree of light transmission, the flexural strength of fiber composite material W in this embodiment may moreover be not less than 20% higher than with a comparable fiber composite material W where monomers A-II fully replace monomers A-I.

Said fiber composite material W more preferably comprises:
(A) a polymer matrix in the form of a thermoplastic polymer composition A comprising:
  (A1) at least one copolymer C constructed from maleic anhydride (MA) at not less than 0.1 wt %, as monomers A-I, plus monomers A-II and optionally further monomers,
  (A2) optionally one or more dyes F; and
  (A3) optionally one or more assistants H; and
(B) fibers B whose surface displays hydroxyl groups as functional groups B-I which form a covalent bond with said monomers A-I, but not with said monomers A-II,
wherein the light transmission through said fiber composite material W is not less than 10% higher than with a comparable fiber composite material W where monomers A-II fully replace said monomers A-I.

In addition to or in lieu of the increased degree of light transmission, the flexural strength of fiber composite material W in this embodiment may moreover be not less than 20% higher than with a comparable fiber composite material W where monomers A-II fully replace monomers A-I.

In addition to or in lieu of the increased degree of light transmission and/or increased flexural strength, a lower level of surface waviness is obtainable for fiber composite material W, for instance as represented on the surface of said fiber composite material W by a central total waviness profile height of below 30 µm, preferably below 15 µm, more preferably below 10 µm, more preferably below 8 µm, especially below 7 µm.

Fiber composite material W has a thermal expansion, which is chiefly responsible for the wave formation at the surface of fiber composite material W which is preferably in the range from 0 to $5 \cdot 10^{-6}$/K.

A low level of surface waviness is attainable in particular when the following features are present:
(a) an amorphous thermoplastic polymer composition A ((substantial) absence of crystalline constituents), which is used as the polymer matrix, being used during the consolidation phase of fiber composite material W;
(b) high flowability on the part of polymer composition A used as polymer matrix; and
(c) high chemical affinity of monomers A-I for reinforcing fiber, especially through the formation of covalent bonds.

In a particularly preferred embodiment of fiber composite material W,
(A) said polymer matrix A comprises not less than 75 wt % of styrene copolymer C, maleic anhydride (MA) as monomers A-I, styrene (S) as monomers A-II and preferably acrylonitrile (AN) as monomers A-III; and
(B) said fibers B are glass fibers displaying hydroxyl groups in the form of silanol groups as functional groups B-I on the surface,
wherein the MA moieties are at least partly esterified with the silanol groups on the surface of said fibers B.

The proportion of MA moieties esterified with the silanol groups at the surface of fibers B is preferably not less than 5 mol %, more preferably not less than 10 mol %, yet more preferably not less than 20 mol %, yet more preferably not less than 30 mol %, yet more preferably not less than 50 mol % and yet more preferably not less than 70 mol %.

Fiber composite material W is yet more preferably such that:
(A) said thermoplastic polymer composition A comprises not less than 80 wt % (preferably not less than 95 or not less than 98 wt %) of copolymer C, wherein said copolymer C consists of:
  0.1-1 wt % maleic anhydride (MA) as monomers A-I,
  74-74.9 wt % of styrene (S) as monomers A-II,
  25 wt % of acrylonitrile (AN) as monomers A-III; and
(B) said fibers B are glass fibers displaying hydroxyl groups in the form of silanol groups as functional groups B-I on the surface,
wherein the MA moieties are at least partly (preferably at not less than 5 mol %, more preferably at not less than 20 mol %, especially at not less than 50 mol %) esterified with the silanol groups on the surface of said fibers B.

Fiber composite material W yet more preferably consists of:
(A) 20-99.5 wt % of a thermoplastic polymer composition A which consists of not less than 80 wt % (preferably not less than 95 or not less than 98 wt %) of copolymer C, wherein said copolymer C consists of:
  0.1-1 wt % of maleic anhydride (MA) as monomers A-I,
  74-74.9 wt % of styrene (S) as monomers A-II,
  25 wt % of acrylonitrile (AN) as nonomers A-III; and
(B) 0.5-80 wt % of said fibers B which are glass fibers displaying hydroxyl groups in the form of silanol groups as functional groups B-I on the surface,
wherein the MA moieties are at least partly (preferably at not less than 5 mol %, more preferably at not less than 20 mol %, especially at not less than 50 mol %) esterified with the silanol groups on the surface of said fibers B.

It is very particularly preferable for fiber composite material W to consist of:
(A) 20-99.5 wt % of a thermoplastic polymer composition A which consists of not less than 95 wt % of copolymer C, wherein said copolymer C consists of:
  0.1-1 wt % of maleic anhydride (MA) as monomers A-I,
  74-74.9 wt % of styrene (S) as monomers A-II,
  25 wt % of acrylonitrile (AN) as nonomers A-III; and
(B) 0.5-80 wt % of said fibers B which are glass fibers displaying hydroxyl groups in the form of silanol groups as functional groups B-I on the surface,
wherein the MA moieties are esterified at not less than 20 mol % with the silanol groups on the surface of said fibers B.

Light transmission, as set forth above, is not less than 10% higher in the fiber composite material W which is in accordance with the present invention than with a comparable fiber composite material W where monomers A-II fully replace monomers A-I.

In one preferred embodiment, the light transmission through said fiber composite material W is not less than 15%, preferably not less than 20% and especially not less than 25%, higher than with a comparable fiber composite material W where monomers A-II fully replace said monomers A-I.

In one preferred embodiment, the flexural strength of said fiber composite material W is not less than 20%, preferably not less than 25%, more preferably not less than 30% and especially not less than 50%, higher than with a comparable fiber composite material W where monomers A-II fully replace said monomers A-I.

In a more preferred embodiment,
(a) the light transmission through said fiber composite material W is not less than 15%, preferably not less than 20% and especially not less than 25%, higher than with a comparable fiber composite material W where monomers A-II fully replace said monomers A-I; and
(b) the flexural strength of said fiber composite material W is not less than 20%, preferably not less than 25%, more preferably not less than 30% and especially not less than 50%, higher than with a comparable fiber composite material W where monomers A-II fully replace said monomers A-I.

As already noted above, the fiber composite material W which is in accordance with the present invention allows eschewal of adhesion promoter. Since the application of such adhesion promoters typically requires an additional operating step, said fiber composite material W preferably includes no adhesion promoter.

Preferably, no adhesion promoter was used in the production of fiber composite material W.

In one preferred embodiment, no adhesion promoter from the group consisting of aminosilanes and epoxy compounds was used in the production of the fiber composite material W.

Therefore, the fiber composite material W produced preferably contains no adhesion promoter, especially no adhesion promoter from the group consisting of aminosilanes and epoxy compounds, or chemical reaction products thereof.

In a much preferred embodiment, said fibers B embed layerwise into said fiber composite material W and no adhesion promoter was used in the production of said fiber composite material W.

In a particularly preferred embodiment, said fibers B embed layerwise as wovens or noncrimp fabrics, especially as wovens, into said fiber composite material W and no adhesion promoter from the group consisting of aminosilanes and epoxy compounds was used in the production of said fiber composite material W.

Alternatively, however, fiber composite material W may also comprise one or more adhesion promoters capable of modifying (i.e., strengthening or weakening) the bond between constituents of thermoplastic polymer composition A and constituents of fiber B. For example, groups of fibers B may each be provided with various adhesion promoter compositions effective to produce different fiber-matrix adherences. The different compositions may differ in the concentrations only or else have other compositions. The different adhesion promoter compositions make it possible to establish different fiber-matrix adherences. The adhesion promoter may even be applied as part of the size in the production of fibers B.

However, there may also be provided an additional operation of thermal desizing or other desizing, to remove or destroy the previously applied size. Fiber B may in that case be subsequently coated with a finish which contains the adhesion promoter and is aligned with the particular polymer matrix and the desired fiber-matrix adherence. Synthetic resin sizes may also be used as an alternative. For example, a fiber composite material W which is accordance with the present invention may utilize adhesion promoters comprising crosslinkable polyether urethane and polyester urethane polymers, which act as film-formers, together with, for instance, an aminosilane adhesion promoter.

In a particularly preferred embodiment, said fibers B embed layerwise as wovens into said fiber composite material W and no adhesion promoter from the group consisting of aminosilanes and epoxy compounds was used in the production of said fiber composite material W, especially no adhesion promoter at all.

In another particularly preferred embodiment said fibers B embed layerwise as wovens into said fiber composite material W and said thermoplastic polymer composition A comprises (or consists (substantially) of):
  0.1-5 wt % of maleic anhydride (MA) as monomers A-I,
  70-80 wt % of styrene (S) as monomers A-II, and
  15-29.9 wt % of acrylonitrile (AN) as monomers A-III.

In a yet more preferred embodiment, fibers B embed layerwise as wovens into said fiber composite material W and no adhesion promoter from the group consisting of aminosilanes and epoxy compounds was used in the production of said fiber composite material W, especially no adhesion promoter at all and said thermoplastic polymer composition A comprises (or consists (substantially) of):

0.1-5 wt % of maleic anhydride (MA) as monomers A-I,
70-80 wt % of styrene (S) as monomers A-II, and
15-29.9 wt % of acrylonitrile (AN) as monomers A-III.

Further features as described above are present in particular. Thus, in these particularly preferred embodiments, too, fibers B are glass fibers displaying hydroxyl groups in the form of silanol groups as functional groups B-I on the surface.

It is therefore particularly preferred for the present invention to provide (a/one) fiber composite material W comprising (consisting of):
- (A) 20-99.5 wt % of a thermoplastic polymer composition A consisting of:
  - (A1) at least one copolymer C consisting of
    - 0.1-5 wt % of maleic anhydride (MA) as monomers A-I,
    - 70-80 wt % of styrene (S) as monomers A-II, and
    - 15-29.9 wt % of acrylonitrile (AN) as monomers A-III;
  - (A2) optionally one or more dyes F; and
  - (A3) optionally one or more assistants H; and;
- (B) 0.5-80 wt % of said fibers B as glass fibers displaying hydroxyl groups in the form of silanol groups as functional groups B-I) on the surface which form a covalent bond with said monomers A-I but not with monomers A-II; and
- (C) 0-79.5 wt % of polymer D, wherein said fibers B embed layerwise as wovens into said fiber composite material W and
wherein preferably no adhesion promoter from the group consisting of aminosilanes and epoxy compounds, especially no adhesion promoter at all, was used,
wherein the light transmission through said fiber composite material W is not less than 10% higher than with a comparable fiber composite material W where monomers A-II fully replace said monomers A-I, and
wherein optionally:
the flexural strength of said fiber composite material W is not less than 20% higher than with a comparable fiber composite material W where monomers A-II fully replace said monomers A-I, and/or
wherein the surface waviness of said fiber composite material W displays central total waviness profile heights of below 30 µm, preferably below 15 µm, on the surface of said fiber composite material W.

Producing a fiber composite material W having enhanced translucency and/or enhanced flexural strength.

The present invention also comprehends a method of producing a fiber composite material W having enhanced translucency.

The present invention also comprehends a method of producing a fiber composite material W having enhanced flexural strength. In particular, the present invention also comprehends a method of producing a fiber composite material W having enhanced translucency and enhanced flexural strength.

A further aspect of the present invention accordingly provides a method of producing a fiber composite material W having enhanced translucency and optionally enhanced flexural strength, said method comprising the steps of:
(i) providing:
- (A) a polymer matrix in the form of a thermoplastic polymer composition A comprising:
  - (A1) at least one copolymer C comprising monomers A-I and monomers A-II and optionally further monomers;
  - (A2) optionally one or more dyes F; and
  - (A3) optionally one or more assistants H; and
- (B) fibers B whose surface displays functional groups B-I which are capable of forming a covalent bond with said monomers A-I, but not with said monomers A-II;

(ii) melting said thermoplastic polymer composition A and contacting same with said fibers B from step (i); and
(iii) reacting at least some of said monomers A-I of said copolymer C and at least some of said functional groups B-I of said fibers B from step (ii) to form covalent bonds.

The production method of the present invention may comprise the impregnation, consolidation and solidification phases customary in the production of composite engineering materials, while the process is naturally able to be influenced via the choice of temperature, pressure and times employed.

In one preferred embodiment, said fiber composite material W is as defined above. The definitions recited above accordingly apply in connection with the present method, especially the hereinbelow itemized preferred embodiments:

The present invention also provides a method of producing a fiber composite material W having smooth surfaces, which comprises the abovementioned steps (i)-(iii).

The present invention preferably provides a method of producing a fiber composite material W having
 (a) enhanced translucency and enhanced flexural strength;
 (b) enhanced translucency and lower surface undulation;
 (c) enhanced flexural strength and lower surface undulation; or
 (d) enhanced translucency, enhanced flexural strength and lower surface undulation, wherein (a), (b), (c) or (d) each comprises method steps (i)-(iii) as described above.

The step of consolidation and solidification, hence of curing the polymer matrix ex thermoplastic polymer composition A is preferably practiced so as to prevent rapid setting of the polymer matrix. It is advantageous here to use a polymer matrix ex an amorphous thermoplastic polymer composition A, since such does not have a clear melting/setting temperature.

The volume reduction in the cooling phase, the significant driver for visible surface waviness, is reduced by the absence of crystalline constituents. Using amorphous polymer compositions A also eliminates a defined melting/setting temperature which, on cooling, leads to abrupt rigidification of the matrix and prevents any equalizing flows.

In addition, the flowability of amorphous thermoplastic polymer composition A is preferably comparatively high. The heightened flowability due to low viscosity makes it possible for thermoplastic polymer composition A of the polymer matrix—long into the cooling phase—to counteract shrinkage differences, and close nascent "matrix gaps" near the surface, by virtue of the consolidation pressure acting from the outside.

Step (iii) preferably includes the formation of numerous covalent bonds between monomers A-I and fiber B.

The high chemical affinity for fiber B furthers the impregnation of the reinforcing structure, i.e., complete, rapid and uniform saturation of fibers B by polymer melt ex thermoplastic polymer composition A during a pressing operation. This particularly uniform impregnation likewise reduces substantial fluctuations of fiber and matrix volume fractions along the semi-finished product and therefore furthers a smooth, nonwavy surface.

In one preferred embodiment, said fiber composite material W consists of:
20-99.5 wt % of thermoplastic polymer composition A;
0.5-80 wt % of fibers B; and
0-79.5 wt % of polymer D.

For example, said fiber composite material W consists of: 20-99.5 wt % of thermoplastic polymer composition A; 0.5-80 wt % of fibers B.

For example, said fiber composite material W consists of: 20-50 wt %, 30-60 wt %, 40-60 wt %, 40-50 wt %, 50-60 wt %, 50-99.5 wt %, 75-90 wt % or 80-95 wt % of thermoplastic polymer composition A; and plus an amount of fibers B (and optionally further components, such as polymer D) that is equal to the respective balance missing from a 100 wt % total mass for said fiber composite material W.

In one preferred embodiment, said fiber composite material W comprises 20-50% by volume, 30-60% by volume, 40-60% by volume, 40-50% by volume, 50-60% by volume, 50-99.5% by volume, 75-90% by volume or 80-95% by volume of thermoplastic polymer composition A, based on the total volume of fiber composite material W.

In one preferred embodiment, said fiber composite material W comprises 20-50% by volume, 30-60% by volume, 40-60% by volume, 40-50% by volume, 50-60% by volume, 50-99.5% by volume, about 75-90% by volume or 80-95% by volume of fibers B, based on the total volume of fiber composite material W.

In a particularly preferred embodiment, said fiber composite material W comprises (or consists of):
40-70% by volume, preferably 50-60% by volume, especially 55-60% by volume of thermoplastic molding composition A (especially styrene-acrylonitrile-maleic anhydride terpolymer comprising not less than 0.1 wt % of maleic anhydride) and
30-60% by volume, preferably 40-50% by volume, especially 40-45% by volume (fiber volume fraction) of fibers B (especially glass fibers, more particularly imported as wovens and/or noncrimp fabrics).

In one preferred embodiment, said fiber composite material W displays in cross section (hence at the cut edge when a flat fiber composite material W is cut (with a pair of scissors for example) to size, on average, as averaged across the full fiber composite material W):
40-70%, preferably 50-60%, especially 55-60%, of thermoplastic molding composition A (especially styrene-acrylonitrile-maleic anhydride terpolymer, comprising not less than 0.1 wt % of maleic anhydride) and
30-60%, preferably 40-50%, especially 40-45% (fiber-thickness fraction) of fibers B (especially glass fibers, more particularly imported as wovens and/or noncrimp fabrics), wherein the %ages here correspond to the percentage thickness fraction (of the cut edge).

Along a cut edge through a 1.12 mm thick fiber composite material W, for example, the thickness of the polymer matrix (hence that of thermoplastic molding composition A) may be 0.65 mm (corresponding to 58%) and that of fibers B 0.47 mm (corresponding to 42%).

In one preferred embodiment, said fiber composite material W has an overall density of 0.5 to 2.5 g/ml, more preferably of 1 to 2 g/ml, especially 1.5 to 1.75 g/ml, an example being 1.7 g/ml±10%.

In one preferred embodiment, said copolymer C has a construction comprising not less than 0.1 wt %, preferably not less than 0.5 wt % and especially not less than 1 wt % of monomers A-I.

In one particularly preferred embodiment, said thermoplastic polymer composition A comprises not less than 90 wt %, preferably not less than 95 wt % and especially not less than 98 wt % of said copolymer C.

In one preferred embodiment, said monomers A-I are selected from the group consisting of maleic anhydride (MA), N-phenylmaleimide (PM), tert-butyl (meth)acrylate and glycidyl (meth)acrylate (GM), for example selected from the group consisting of maleic anhydride (MA), N-phenylmaleimide (PM) and glycidyl (meth)acrylate (GM).

In one preferred embodiment, copolymer C is a styrene copolymer C, comprising styrene (S) as monomers A-II.

In a much preferred embodiment, thermoplastic polymer composition A comprises:
0.1-5 wt % of maleic anhydride (MA) as monomers A-I,
50-99.9 wt % of styrene (S) as monomers A-II, and
0-49.9 wt % of acrylonitrile (AN) as monomers A-III.
Styrene copolymer C more preferably consists of:
0.1-5 wt % of maleic anhydride (MA) as monomers A-I,
65-85 wt % of styrene (S) as monomers A-II,
10-34.9 wt % of acrylonitrile (AN) as monomers A-III.
Thus, for example styrene copolymer C may consist of:
0.1-5 wt % of maleic anhydride (MA) as monomers A-I,
70-80 wt % of styrene (S) as monomers A-II, and
15-29.9 wt % of acrylonitrile (AN) as monomers A-III.

For example, thermoplastic polymer composition A may comprise not less than 95 wt % of copolymer C, the latter consisting of:
0.1-1 wt % of maleic anhydride (MA) as monomers A-I,
74-74.9 wt % of styrene (S) as monomers A-II,
25 wt % of acrylonitrile (AN) as nonomers A-III.

In a further preferred embodiment, functional groups B-I at the surface of fibers B are selected from hydroxyl, ester and amino groups.

In a more preferred embodiment, fibers B are glass fibers displaying hydroxyl groups in the form of silanol groups as functional groups B-I on the surface.

In one preferred embodiment, said fibers B embed into said fiber composite material W layerwise.

It is also possible for a plurality of layers, hence two or more layers, of fibers B to be embedded in said fiber composite material W, hence, say, two, three, four, five, six, seven, eight, nine, ten, 10-20, 15-25, 20-50 or yet even more layers. The fiber composite material then has a laminate-like constitution.

By way of example, the further layers may have the same or else a different type of construction as/than those which are in accordance with the present invention, described herein.

In a more preferred embodiment, said fibers B are embedded into said fiber composite material W as wovens or noncrimp fabrics, especially as wovens.

In a particularly preferred embodiment of fiber composite material W,
(A) said polymer matrix A comprises not less than 75 wt % of styrene copolymer C, maleic anhydride (MA) as monomers A-I, styrene (S) as monomers A-II and preferably acrylonitrile (AN) as monomers A-III; and
(B) said fibers B are glass fibers displaying hydroxyl groups in the form of silanol groups as functional groups B-I on the surface,
wherein the MA moieties are at least partly esterified with the silanol groups on the surface of said fibers B.

In one preferred embodiment, the light transmission through the fiber composite material W obtained is not less than 15%, preferably not less than 20% and especially not less than 25%, higher than with a comparable fiber composite material W where monomers A-II fully replace said monomers A-I.

In one preferred embodiment, the flexural strength of said fiber composite material W is not less than 20%, preferably not less than 25%, more preferably not less than 30% and especially not less than 50%, higher than with a comparable fiber composite material W where monomers A-II fully replace said monomers A-I.

In a more preferred embodiment,
(a) the light transmission through said fiber composite material W is not less than 15%, preferably not less than 20% and especially not less than 25%, higher than with a comparable fiber composite material W where monomers A-II fully replace said monomers A-I; and
(b) the flexural strength of said fiber composite material W is not less than 20%, preferably not less than 25%, more preferably not less than 30% and especially not less than 50%, higher than with a comparable fiber composite material W where monomers A-II fully replace said monomers A-I.

In one preferred embodiment of the method according to the present invention, no adhesion promoter from the group consisting of aminosilanes and epoxy compounds is used.

Step (ii) of the method according to the present invention hence the step of melting said thermoplastic polymer composition A and contacting this melt with said fibers B, may be effected in any manner suitable therefore. Such an impregnating treatment may involve the matrix being conveyed into a flowable state and said fibers B being wetted to form a boundary layer.

In one preferred embodiment of practicing the method, said steps (ii) and (iii) are carried out concurrently.

Therefore, immediately as said thermoplastic polymer composition A is contacted with said fibers B, a chemical reaction takes place whereby said monomers A-I form a covalent bond with the surface of said fibers B (generally via a bond to said functional groups B-I). This chemical reaction may be, for example, an esterification (e.g., the esterification of maleic anhydride monomers with silanol groups belonging to a glass fiber). Alternatively, the formation of a covalent bond may also be initiated (e.g., by heating, free-radical initiator and/or photoinitiation) in a separate step. This may be done at any suitable temperature.

In one preferred embodiment, said steps (ii) and/or (iii) are carried out at a temperature of not less than 200° C., preferably not less than 250° C., more preferably not less than 300° C., yet more preferably at 300° C. to 400° C. and especially at 300° C.-340° C.

The temperatures which are employed here are preferably, say, in the range from 50° C. to 400° C., more preferably in the range from 50° C. to 360° C., yet more preferably in the range from 50° C. to 350° C., yet more preferably in the range from 75° C. to 350° C., yet more preferably in the range from 100° C. to 350° C., yet more preferably in the range from 150° C. to 350° C., yet more preferably in the range from 200° C. to 350° C., yet more preferably in the range from 250° C. to 350° C., yet more preferably in the range from 300° C. to 350° C., especially in the range from 300° C. to 340° C.

Care should preferably be taken here to ensure that ideally no pyrolysis occurs and the components used are thermally decomposed only minimally (at <50%), if at all, bar compositions which release reactive groups by thermal elimination, as is the case with tert-butyl (meth)acrylate for example. Thermal elimination in this case at temperatures starting at about 200° C. releases isobutene, and the functional group which remains behind (which is essentially an acid function) is then able to react with the fiber surface.

In one preferred embodiment, therefore, said steps (ii) and/or (iii) are carried out such that the residence time at temperatures of ≥200° C. is not more than 10 min, preferably not more than 5 min, more preferably not more than 2 min and especially not more than 1 min.

The method, especially steps (ii) and/or (iii), may in principle be carried out at any desired pressure (preferably atmospheric pressure or overpressure), with and without contact pressure being applied to the components. Applying contact pressure does improve the properties of fiber composite material W.

In one preferred embodiment, therefore, said steps (ii) and/or (iii) are carried out with a molding pressure of 5-100 bar (for example 5-50 bar) and a molding time of 10-60 s, preferably with a molding pressure of 10-30 bar and a molding time of 15-40 s.

The method which the present invention provides for producing a fiber composite material W having enhanced translucency and/or enhanced flexural strength preferably comprises the steps of:
(i) providing
  (A) a thermoplastic polymer composition A comprising not less than 75 wt % of styrene copolymer C, wherein the styrene copolymer comprises maleic anhydride (MA) as monomers A-I, styrene (S) as monomers A-II and acrylonitrile (AN) as monomers A-III; and
  (B) fibers B which are glass fibers, displaying hydroxyl groups in the form of silanol groups as functional groups B-I on the surface,
(ii) melting said thermoplastic polymer composition A and contacting same with said fibers B from step (i); and
(iii) reacting not less than 20 mol % of said monomers A-I of said copolymer C and at least some of said functional groups B-I of said fibers B from step (ii) to form covalent bonds; and optionally
(iv) three-dimensional shaping to form a shaped article T.

The method which the present invention provides for producing a fiber composite material W having enhanced translucency and/or enhanced flexural strength more preferably comprises the steps of:
(i) providing
  (A) a thermoplastic polymer composition A comprising not less than 75 wt % of styrene copolymer C, wherein the styrene copolymer comprises maleic anhydride (MA) as monomers A-I, styrene (S) as monomers A-II and acrylonitrile (AN) as monomers A-III; and
  (B) fibers B which are glass fibers, displaying hydroxyl groups in the form of silanol groups as functional groups B-I on the surface,
(ii) melting said thermoplastic polymer composition A and contacting same with said fibers B from step (i) at a temperature of not less than 200° C.;
(iii) reacting not less than 20 mol % of said monomers A-I of said copolymer C and at least some of said functional groups B-I of said fibers B from step (ii) to form covalent bonds at a temperature of not less than 200° C.; and optionally
(iv) three-dimensional shaping to form a shaped article T, wherein said steps (ii) and/or (iii) are preferably carried out such that the residence time at temperatures of ≥200° C. is not more than 5 min.

The method which the present invention provides for producing a fiber composite material W having enhanced translucency and/or enhanced flexural strength more preferably comprises the steps of:
(i) providing:
  (A) a thermoplastic polymer composition A consisting of styrene copolymer C consisting of:
    0.1-5 wt % of maleic anhydride (MA) as monomers A-I, 50-90 wt % of styrene (S) as monomers A-II,
5-49.9 wt % of acrylonitrile (AN) as monomers A-III; and
(B) fibers B which are glass fibers, displaying hydroxyl groups in the form of silanol groups as functional groups B-I on the surface,
(ii) melting said thermoplastic polymer composition A and contacting same with said fibers B from step (i) at a temperature of 300-340° C.;
(iii) reacting not less than 20 mol % of said monomers A-I of said copolymer C and at least some of said functional groups B-I of said fibers B from step (ii) to form covalent bonds at a temperature of 300-340° C.; and optionally
(iv) three-dimensional shaping to form a shaped article T, wherein said steps (ii) and/or (iii) are carried out such that the residence time at temperatures of ≥200° C. is not more than 5 min.

Consolidation reduces air inclusions in said fiber composite material W and establishes a good connection between thermoplastic polymer composition A and fibers B (especially in the case of layerwise embedded fibers B). The composite obtained following impregnation and consolidation is preferably (very substantially) pore-free.

Optionally, said fibers B may be layerwise as plies of fibers B impregnated and consolidated with the polymer matrix ex thermoplastic polymer composition A in a single processing step. This is a particularly efficient way to produce said fiber composite material W.

Alternatively, the steps referred to may be carried out separately and consecutively. For example, plies of fibers B comprising differently readied fibers B may initially be readied meaning that said fibers B are impregnated with the polymer matrix ex thermoplastic polymer composition A. Impregnated plies comprising fibers B having differing fiber-matrix adherence may be present thereafter, which are consolidatable, in a further operating step, into a composite in the form of fiber composite material W.

Before the plies of fibers B are laminated with the polymer matrix ex thermoplastic polymer composition A, some or all of said fibers B may be subjected to a pretreatment to influence the later fiber-matrix adherence. The pretreatment may include, for example, a coating step, an etching step, a heat-treating step or a mechanical surface-treating step. More particularly, some of said fibers B may be heated to partly remove a previously applied adhesion promoter for example.

The reinforcing plies may be fully composited with one another in the course of the production process (lamination). Fiber composite material mats of this type offer optimized strength and stiffness in the fiber direction and have particularly advantageous further processing properties.

The method may also encompass the production of a shaped article T.

In one preferred embodiment, the method comprises a further step (iv) of three-dimensional shaping into a shaped article T.

This may be effected in any desired manner, say by mechanical shaping by a shape-conferring body, which may also be a roll with embossing. It is preferred to form the still formable fiber composite material W wherein said thermoplastic polymer composition A is still (partly) molten. Alternatively or additionally, it is also possible for a fully cured fiber composite material W to be cold-formed.

The shaped article T obtained at the end of the method is preferably (substantially) solid.

The method therefore preferably includes a further step (v) of hardening the product obtained from either of steps (iii) and (iv).

This step may also be referred to as solidification. Solidification, which generally takes place by removal of heat, may subsequently lead to a shaped article T which is ready to use. Optionally, said shaped article T may additionally be subjected to secondary finishing (e.g., deburring, polishing, staining, etc.).

The method may be carried out in a continuous, semi-continuous or discontinuous manner.

In one preferred embodiment, the method is carried out as a continuous method, especially as a continuous method of producing smooth or three-dimensionally embossed sheets.

Roll embossing for instance is a way to produce a three-dimensionally embossed sheet. In roll embossing, a sheet can be unwound off a reel and passed over a roll whose surface reproduces the desired structure. A sheet on a reel may similarly be passed through two stacked rolls whose surface reproduces the desired structure. The sheet may finally be wound up on a second reel and stored in that form.

Alternatively, shaped articles T are also obtainable in a semi- or discontinuous manner, say for tools or motor vehicles.

Shaped articles T of this type are also usable as (or as constituents of) windows including washing machine windows, glazing, air shafts, lens covers, light diffuser plates, housings for light fixtures, light guides, etc.

As set forth above, an essential element of the invention resides in the use of monomers A-I in combination with functional groups B-I on fibers B.

In the light of the above, the present invention also teaches the use of monomers A-I in a copolymer C in the production of a fiber composite material W having enhanced translucency and/or enhanced flexural strength comprising said copolymer C and translucent fibers B wherein said fibers B are embedded into said copolymer C so as to create a covalent bond between at least some of functional groups B-I and at least some of said monomers A-I, wherein said fiber composite material W is as defined above and/or the use is effected in accordance with a method as defined above.

The product of the method described above is likewise encompassed by the present invention.

The product as a whole may be transparent, partly transparent or nontransparent. The product may optionally consist of said fiber composite material W. It may optionally be coated on one, two or more sides (e.g., with a metal, paint, copolymer, etc.). For instance, the product may be coated with, for instance, styrene-acrylonitrile copolymer (SAN), styrene-acrylonitrile-maleic anhydride terpolymer (SAN-MA, also S/AN/MA or S/AN/maleic anhydride), ABS or ASA.

The surface of the product may be bright or matte. For example, said fiber composite material W may also be applied to a metal surface (a metal foil for example) and/or be metal-coated, in which case the foil or coating is to remain (at least partly) visible to the naked eye (e.g., a gold or aluminum coating or, respectively, foil). A product may be, for example, a shaped article (e.g., a shaped article for a vehicle or a domestic appliance) or a foil/sheet.

A further aspect of the present invention accordingly relates to a fiber composite material W obtainable by a method as defined above. W preferably has the abovementioned properties. Fiber composite material W as defined above is accordingly preferred here.

The figures, the experimental examples and the claims serve to further illustrate the invention.

FIGURES

Figure 1B:
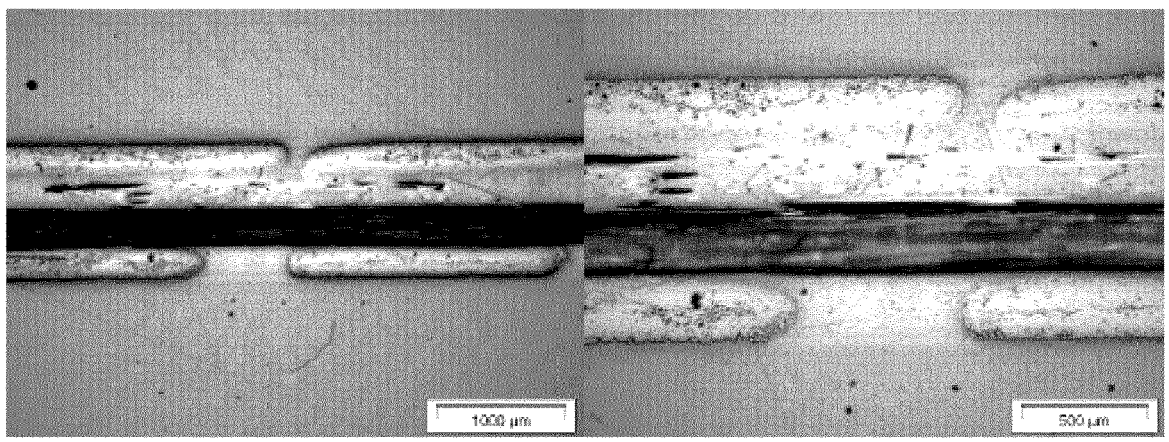
Figure 1C:
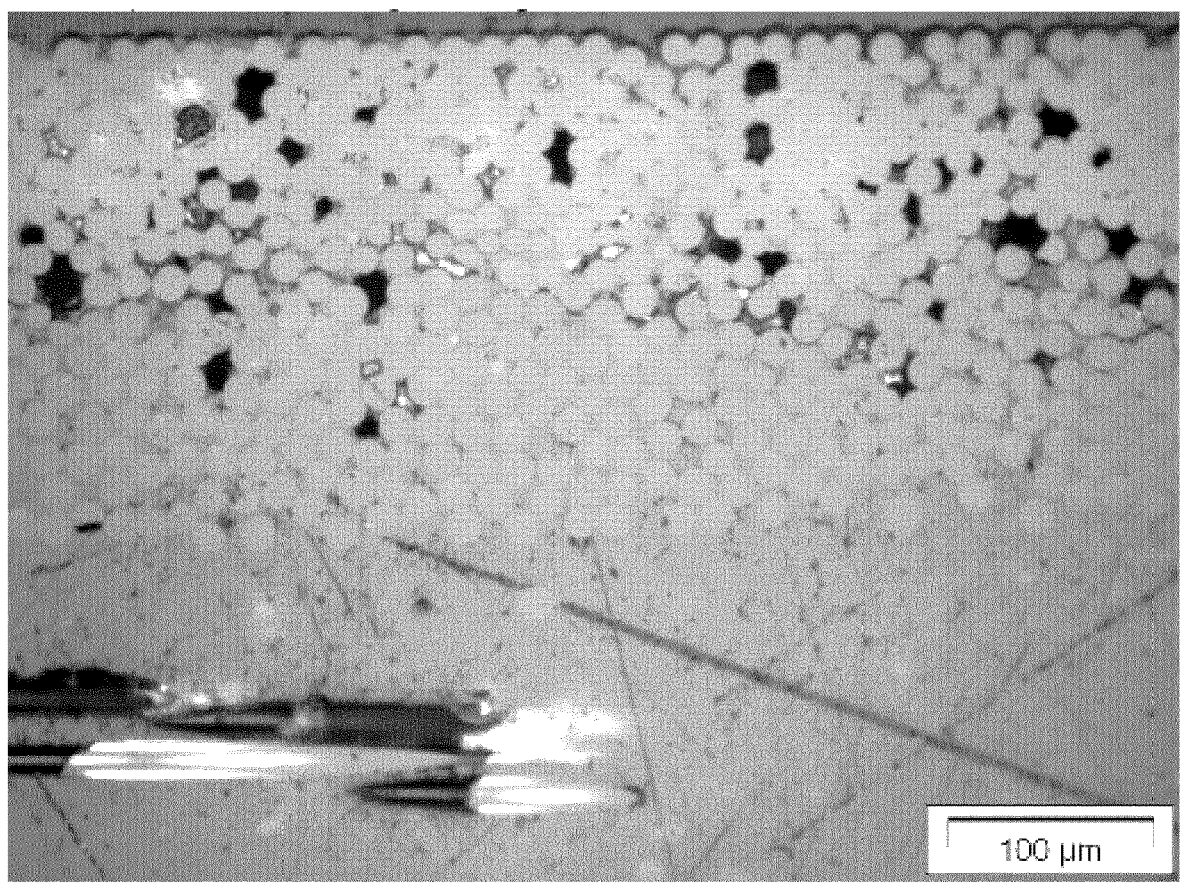

FIG. 1 shows the fiber composite materials W obtained by test #1. FIG. 1A depicts the visual documentation. FIG. 1B shows the microscopic view of a section through the horizontally disposed laminar fiber composite material W (at left: 25 fold magnification, at right: 50 fold magnification), wherein the fibers are clearly recognizable as a horizontally extending dark layer between the light-colored layers of thermoplastic molding composition. FIG. 1C shows the 200 fold magnification, which reveals that the impregnation is incomplete in some places.

Figure 2A:
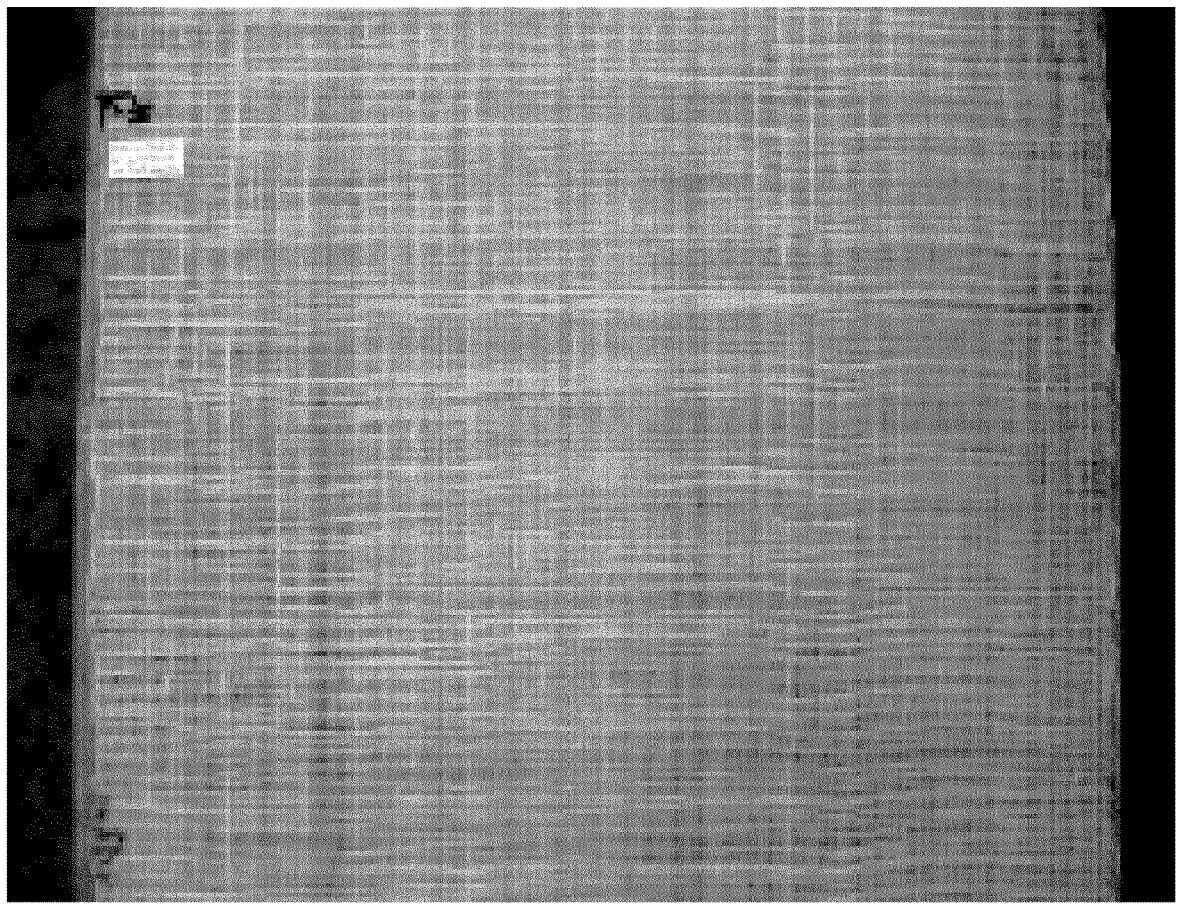
Figure 2B:
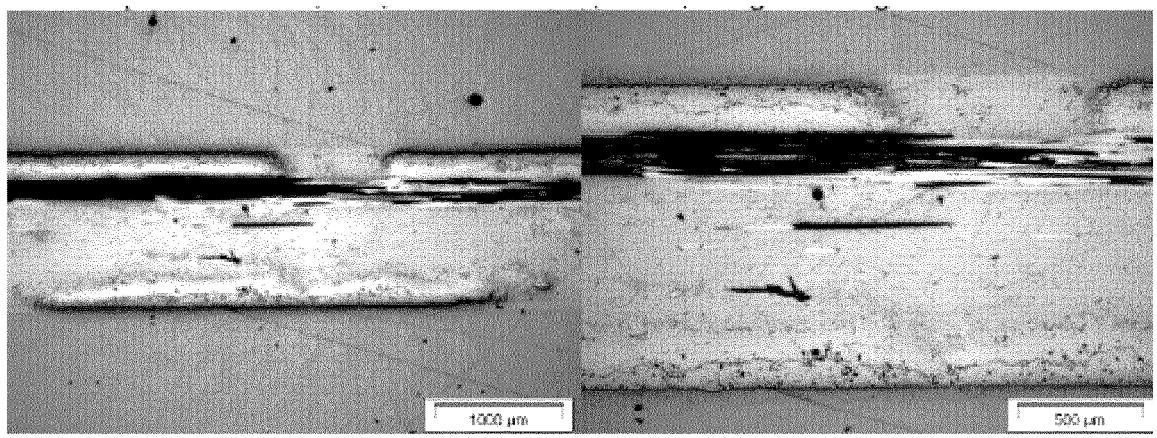
Figure 2C:
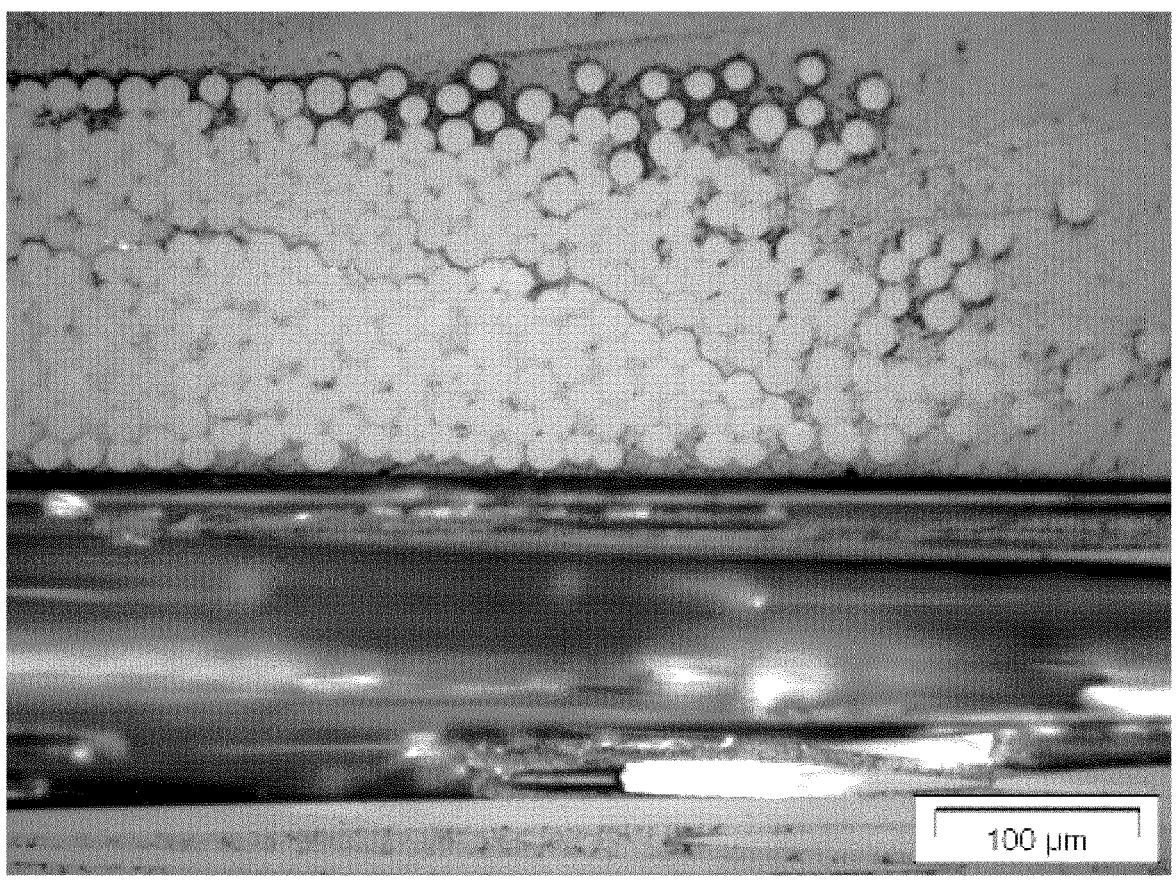

FIG. 2 shows the fiber composite materials W obtained by test #2. FIG. 2A depicts the visual documentation. FIG. 2B shows the microscopic view of a section through the horizontally disposed laminar fiber composite material W (at left: 25 fold magnification, at right: 50 fold magnification), wherein the fibers are clearly recognizable as extending dark layer between the light-colored layers of thermoplastic molding composition. FIG. 2C shows the 200 fold magnification, which reveals that the impregnation is partly incomplete.

Figure 3A:
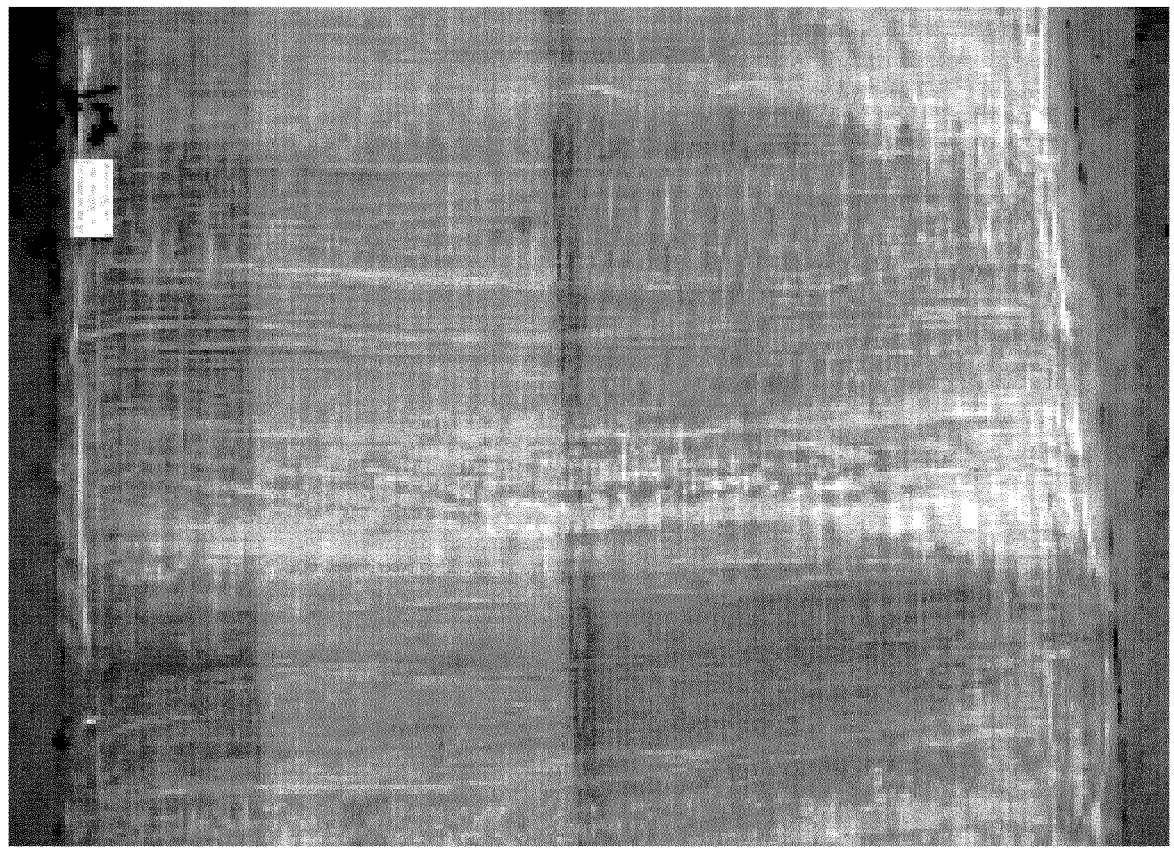
Figure 3B:
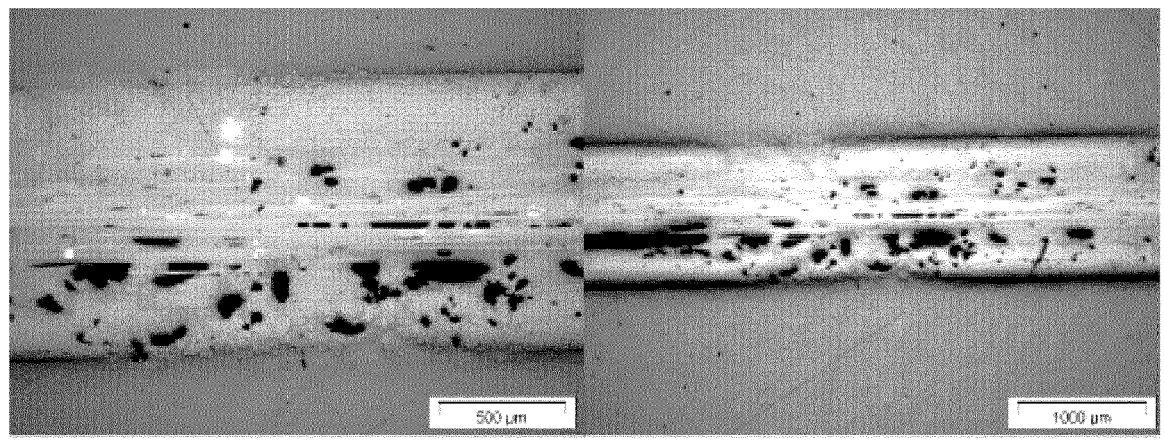
Figure 3C:
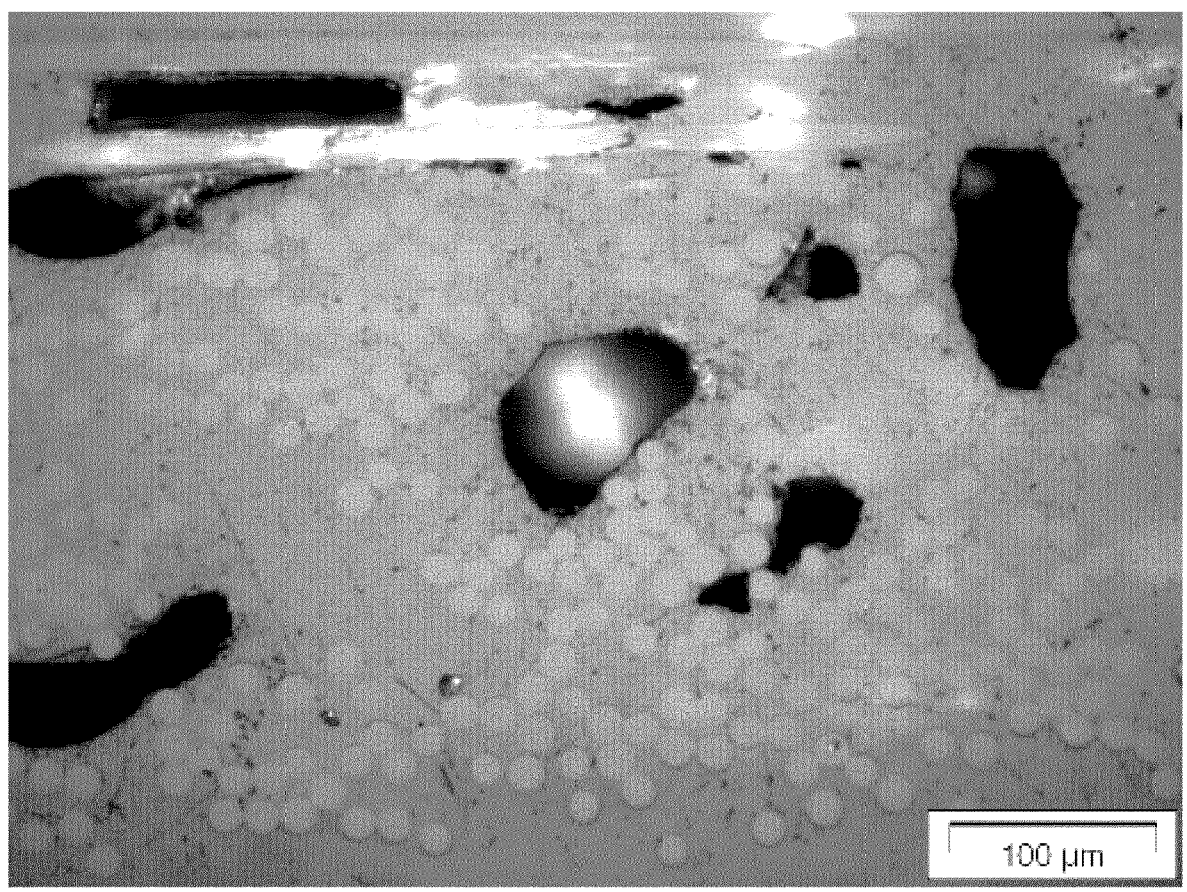

FIG. 3 shows the fiber composite materials W obtained by test #3. FIG. 3A depicts the visual documentation. FIG. 3B shows the microscopic view of a section through the horizontally disposed laminar fiber composite material W (at left: 25 fold magnification, at right: 50 fold magnification), wherein no layer of fibers is recognizable. FIG. 3C shows the 200 fold magnification, which reveals that the impregnation is substantially complete.

Figure 4A:
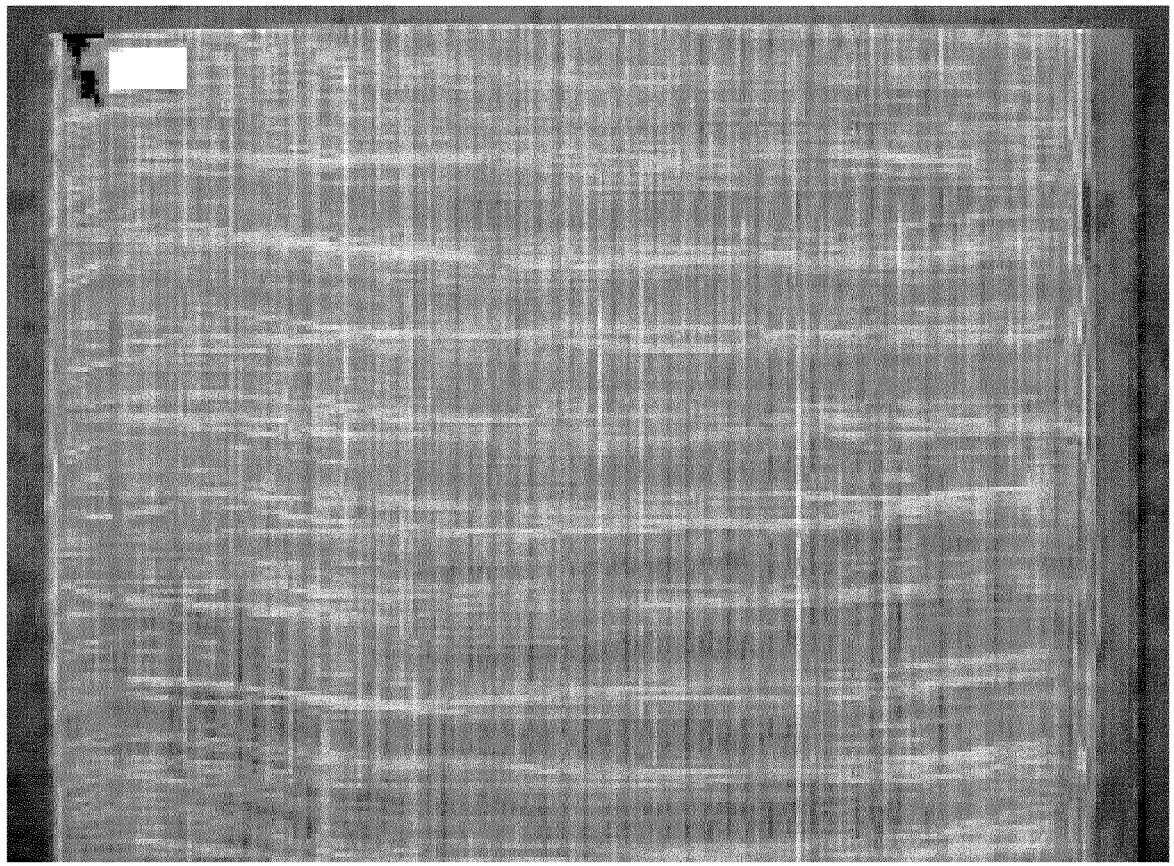
Figure 4B:
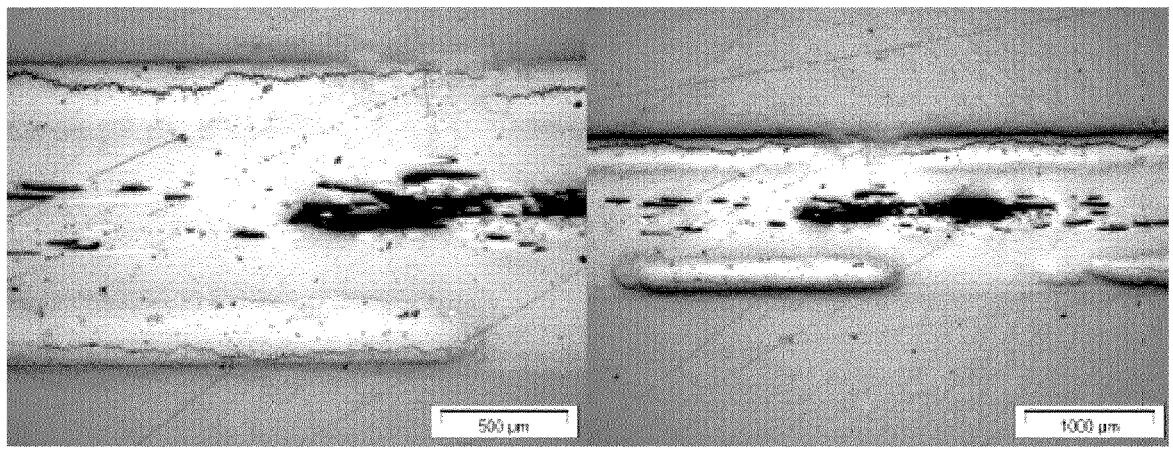
Figure 4C:
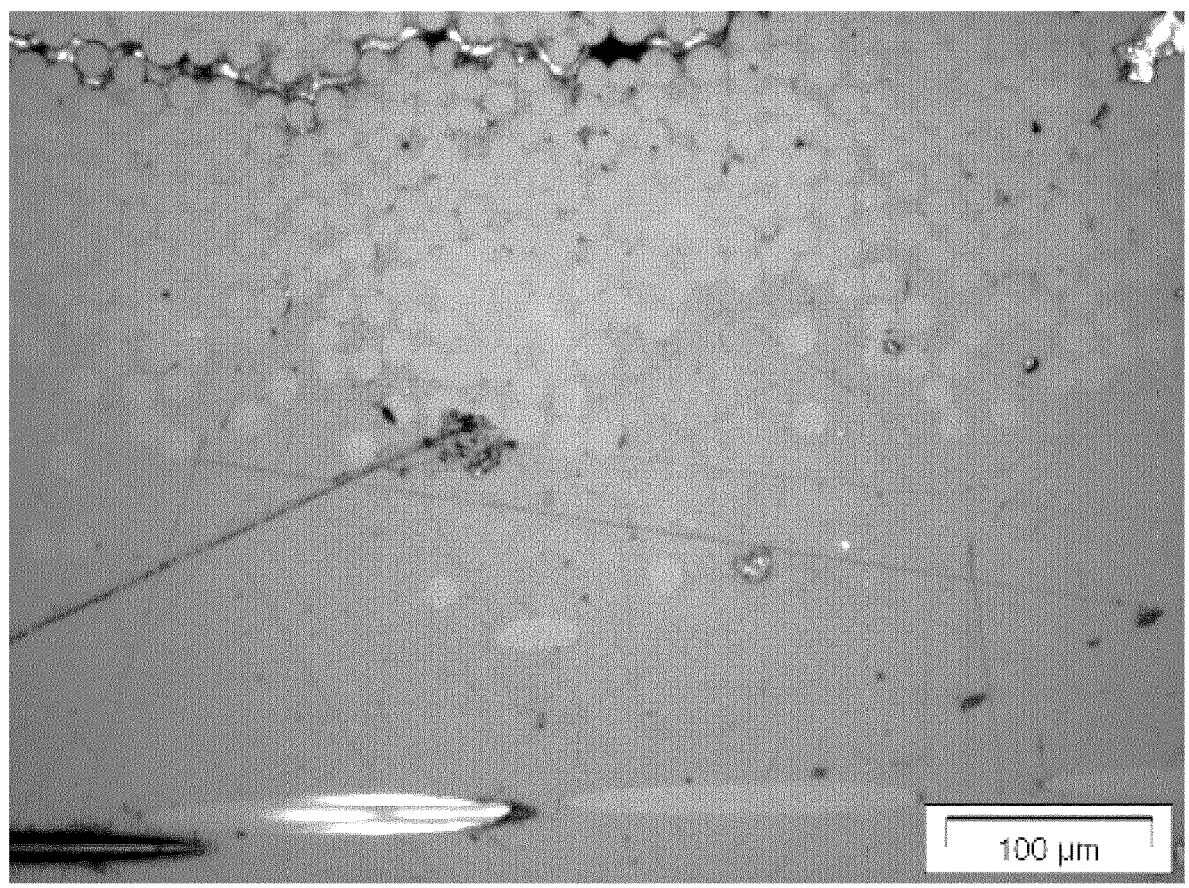

FIG. 4 shows the fiber composite materials W obtained by test #4. FIG. 4A depicts the visual documentation. FIG. 4B shows the microscopic view of a section through the horizontally disposed laminar fiber composite material W (at left: 25 fold magnification, at right: 50 fold magnification), wherein no layer of fibers is recognizable. FIG. 4C shows the 200 fold magnification, which reveals that the impregnation is not fully complete in some places.

Figure 5A:
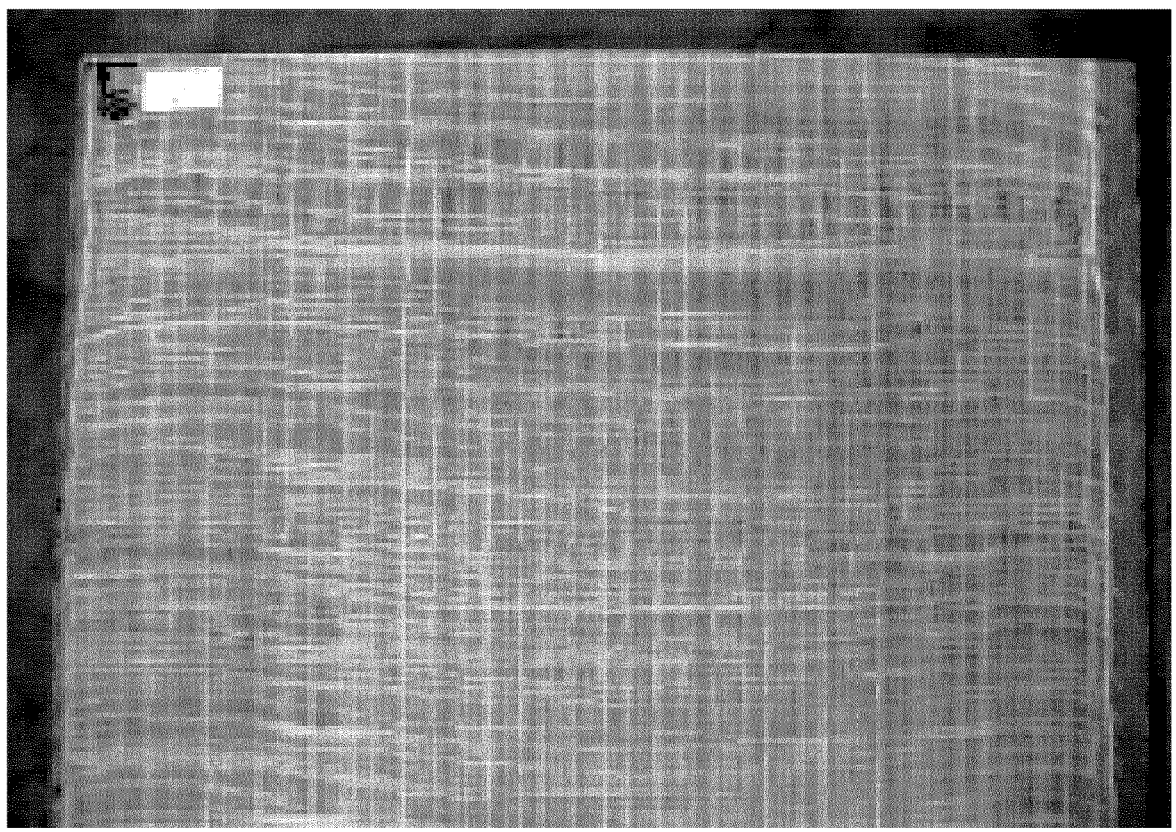
Figure 5B:
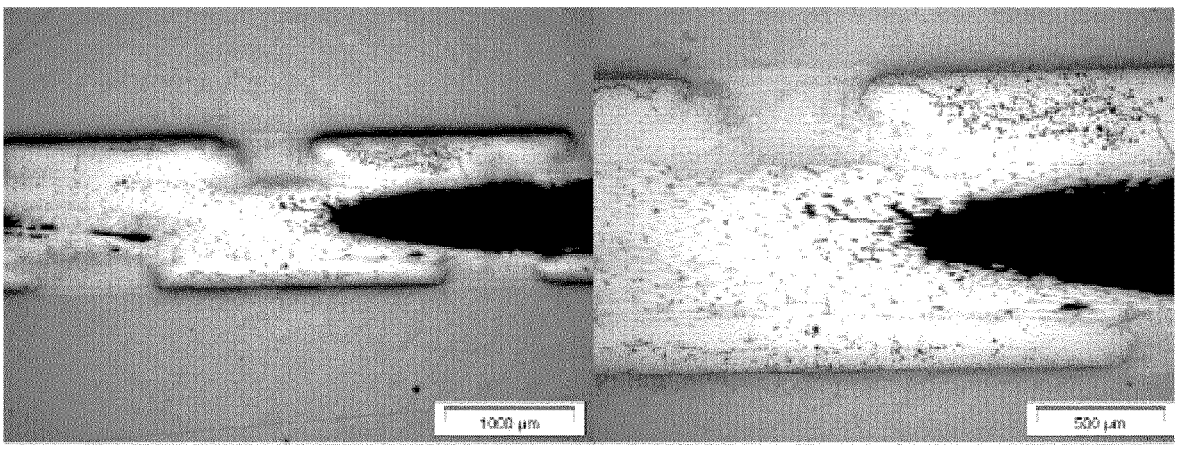
Figure 5C:
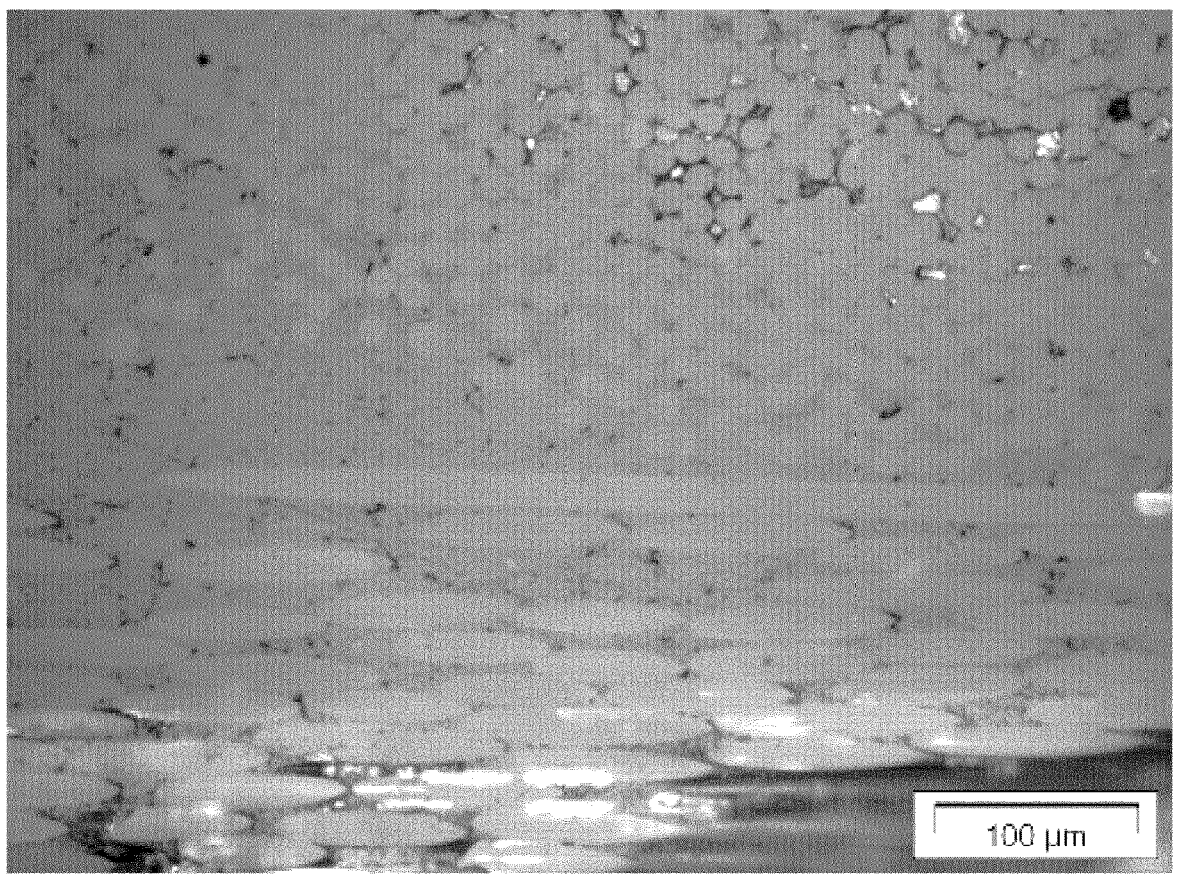

FIG. 5 shows the fiber composite materials W obtained by test #5. FIG. 5A depicts the visual documentation. FIG. 5B shows the microscopic view of a section through the horizontally disposed laminar fiber composite material W (at left: 25 fold magnification, at right: 50 fold magnification), wherein no layer of fibers is recognizable. FIG. 4C shows the 200 fold magnification, which reveals that the impregnation is not fully complete in few places.

Figure 6:
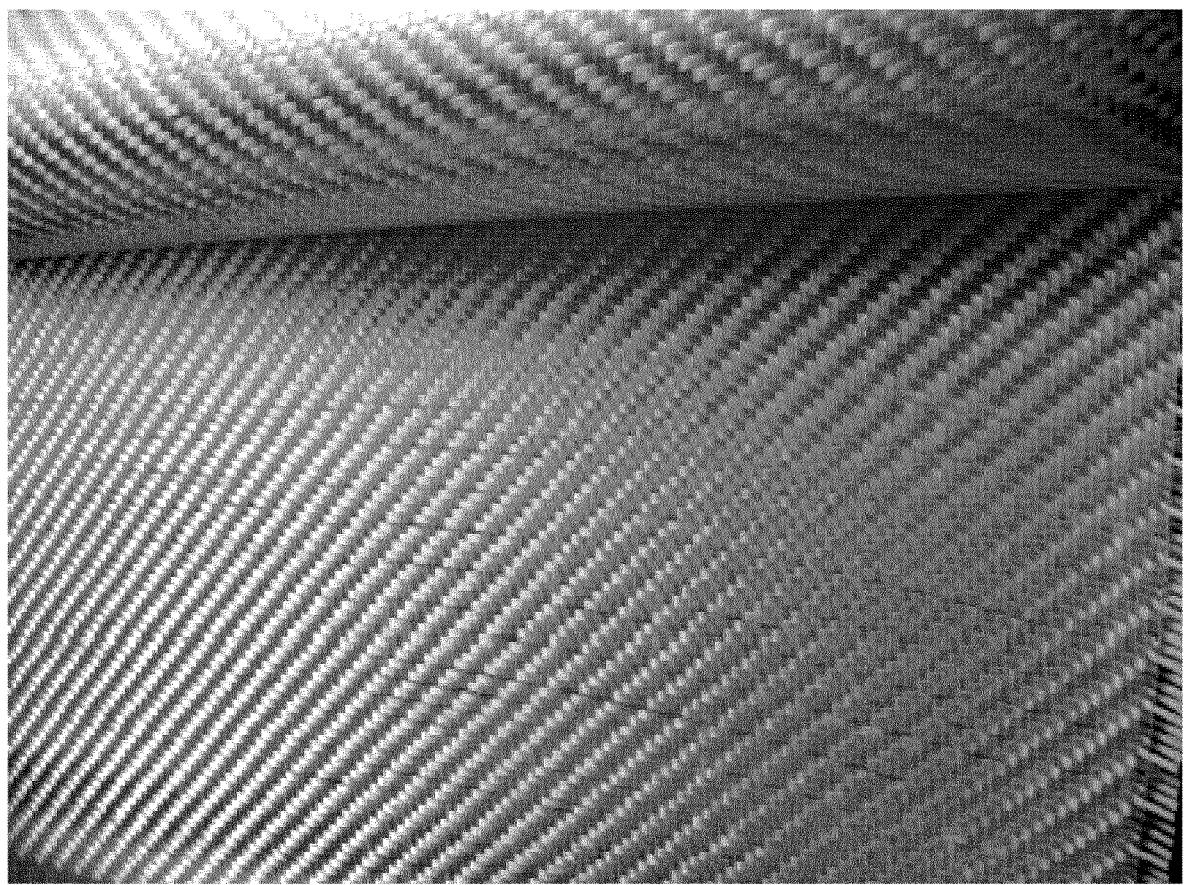

FIG. 6 shows the production of fiber composite materials W (here: woven glass fiber fabrics) in the V25-V28 press inlet. It is clearly apparent that such a production method allows continuous manufacture. What is more, the embossed pattern reveals that said fiber composite material W is also three-dimensionally formable.

Figure 7:
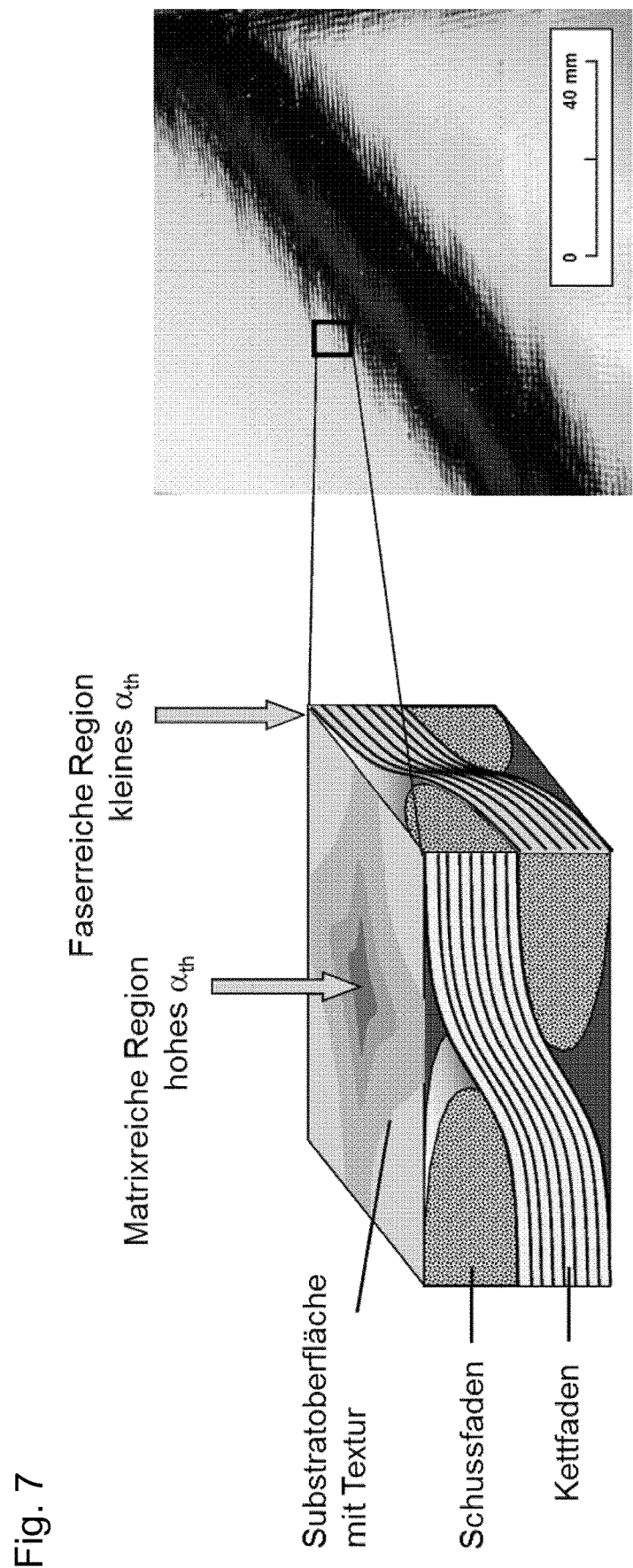

FIG. 7 shows schematically the genesis of the unwanted formation of surface waves (texture).

EXAMPLES

Process Parameters:

Tests were carried out on an interval hot press capable of producing a fiber/sheet composite from polymer sheet, melt or powder, for the quasi-continuous production of fiber-reinforced thermoplastic semi-finished products, laminates and sandwich plates.

Plate width: 660 mm

Laminate thickness: 0.2 to 9.0 mm

Laminate tolerances: max. ±0.1 mm, similar for semi-finished product

Sandwich plate thickness: max. 30 mm

Output: about 0.1-60 m/h, depending on quality and component part thickness

Nominal speed of advance: 5 m/h

Mold pressure: press unit 5-25 bar, continuously adjustable (optional) for minimum and maximum tool size Mold temperature regulation: 3 heating and 2 cooling zones Mold temperature: up to 400° C.

Mold length: 1000 mm

Press opening stroke: 0.5 to 200 mm

Manufacturing direction: right to left

Technical data of melt plastication:

Batchwise melt application in midply for production of fiber-reinforced thermoplastic semi-finished products Screw diameter: 35 mm Max. swept volume: 192 cm$^3$ Max. screw speed: 350 rpm Max. output stream: 108 cm$^3$/s Max. output pressure: 2406 bar specific Transparency was measured on 1 mm organopanel samples in % of white daylight (100%) using a transparency-measuring instrument Byk Haze gard i (BYK-gardner, USA) as per ASTM D 1003 (such as ASTM D 1003-13).

Applied Thermoplastic Combinations A:

A1 (comparative): S/AN with 75% styrene (S) and 25% acrylonitrile (AN), viscosity number 60, Mw 250 000 g/mol (measured via gel permeation chromatography on standard columns with monodisperse polystyrene calibration standards)

A2: S/AN/maleic anhydride copolymer having the composition (wt %): 74/25/1, Mw 250 000 g/mol (measured via gel permeation chromatography on standard columns with monodisperse polystyrene calibration standards)

A3: mixture of A2:A1=2:1

A4: mixture of A2:A1=1:2

Employed Fiber Textiles B:

B1: Bidirectional glass fiber noncrimp fabric 0/90° (GF-GE) of basis weight=590 g/m$^2$, weft+warp=1200 tex [e.g., KN G 590.1 from P-D Glasseiden GmbH]

B2: 2/2 twill glass fiber weave (GF-KG) of basis weight=576 g/m$^2$, weft+warp=1200 tex The combination and parameter settings employed in connection with tests #1-5 are listed in the table which follows:

TABLE 1

Production conditions for fiber composite materials W

| Test # | Composite* | Temperature profile | Molding pressure (bar) | Pressing time (s) | Thickness (mm) |
|---|---|---|---|---|---|
| 1 (comp.) | A1 + B1 | 220-240-260-160-80 | 20 | 20 | 1 |
| 2 (comp.) | A1 + B1 | 220-280-300-160-80 | 25 | 30 | 1 |
| 3 | A2 + B1 | 240-300-320-160-80 | 20 | 20 | 1 |

TABLE 1-continued

Production conditions for fiber composite materials W

| Test # | Composite* | Temperature profile | Molding pressure (bar) | Pressing time (s) | Thickness (mm) |
|---|---|---|---|---|---|
| 4 | A3 + B1 | 240-300-320-160-80 | 20 | 30 | 1 |
| 5 | A4 + B1 | 240-300-320-160-80 | 20 | 30 | 1 |

*Components A + B1: 0.465 mm thickness textile construction, 0.653 mm thickness matrix construction, total volume matrix: 22 ml, fiber volume fraction: 41.6%, overall density of semi-finished product: 1.669 g/ml, overall thickness of semi-finished product: 1.117 mm Test #1 (Comparative Test)
The results are shown in FIG. 1.
Visual Assessment at the Surface of the Semi-finished Product:
  Macroimpregnation: complete
  Microimpregnation: clearly incomplete
Microscopic Assessment in Interior of Semi-finished Product:
  Matrix layer in midply: clearly recognizable
  Matrix layer in topply: not recognizable by roving
  Impregnation of warp threads: unimpregnated regions in the center, slightly impregnated peripherally
  Impregnation of weft threads: distinctly unimpregnated regions in the center, slightly impregnated peripherally
  Air inclusions: minimally and only in the roving
  Consolidation: insufficient, damage to warp and weft threads Test #2
The results are shown in FIG. 2.
Visual Assessment at the Surface of the Semi-finished Product:
  Macroimpregnation: complete
  Microimpregnation: incomplete in several places
Microscopic Assessment in Interior of Semi-finished Product:
  Matrix layer in midply: recognizable
  Matrix layer in topply: minimally recognizable by roving
  Impregnation of warp threads: unimpregnated regions recognizable in the center, partly impregnated peripherally, partly unimpregnated
  Impregnation of weft threads: unimpregnated regions in the center, slightly impregnated peripherally
  Air inclusions: minimal
  Consolidation: inadequate, distinct damage to weft threads Test #3
The results are shown in FIG. 3.
Visual Assessment at the Surface of the Semi-finished Product:
  Macroimpregnation: complete
  Microimpregnation: complete
Test #3, Microscopic Assessment in Interior of Semi-finished Product:
  Matrix layer in midply: not recognizable
  Matrix layer in topply: readily recognizable
  Impregnation of warp threads: unimpregnated regions scarcely recognizable, efficiently impregnated peripherally
  Impregnation of weft threads: unimpregnated regions scarcely recognizable, efficiently impregnated peripherally
  Air inclusions: very many, large blisters recognizable
  Consolidation: good, no damage Test #4
The results are shown in FIG. 4.
Visual Assessment at the Surface of the Semi-finished Product:
  Macroimpregnation: complete
  Microimpregnation: predominantly complete
Microscopic Assessment in Interior of Semi-finished Product:
  Matrix layer in midply: scarcely recognizable
  Matrix layer in topply: recognizable
  Impregnation of warp threads: unimpregnated regions scarcely recognizable, efficiently impregnated peripherally
  Impregnation of weft threads: unimpregnated regions recognizable, but impregnated peripherally
  Air inclusions: none recognizable
  Consolidation: satisfactory, central damage recognizable for weft threads Test #5
The results are shown in FIG. 5.
Visual Assessment at the Surface of the Semi-finished Product:
  Macroimpregnation: complete
  Microimpregnation: predominantly complete
Microscopic Assessment in Interior of Semi-finished Product:
  Matrix layer in midply: not recognizable
  Matrix layer in topply: recognizable
  Impregnation of warp threads: not many unimpregnated regions recognizable, efficiently impregnated peripherally
  Impregnation of weft threads: not many unimpregnated regions recognizable, efficiently impregnated peripherally
  Air inclusions: none recognizable
  Consolidation: partly good, partly insufficient, local damage recognizable for weft threads Summary of Test Results

TABLE 2

Summary of tests and assessment

| Test # | Composite* | Maleic anhydride concentration (wt %) | Max. temperature (° C.) | Impregnation** Macro | Impregnation** Micro | Transparency (%) | Consolidation** |
|---|---|---|---|---|---|---|---|
| 1 (comp.) | A1 + B1 | 0 | 260 | 1 | 5 | 1 | 5 |
| 2 (comp.) | A1 + B1 | 0 | 300 | 1 | 4 | 3 | 4 |
| 3 | A2 + B1 | 1 | 320 | 1 | 1 | 40 | 2 |
| 4 | A3 + B1 | 0.66 | 320 | 1 | 2 | 25 | 3 |
| 5 | A4 + B1 | 0.33 | 320 | 1 | 2 | 20 | 4 |

*Components A + B1: 0.465 mm thickness textile construction, 0.653 mm thickness matrix construction, total volume matrix: 22 ml, fiber volume fraction: 41.6%, overall density of semi-finished product: 1.669 g/ml, overall thickness of semi-finished product: 1.117 mm
**1 = perfect, 2 = good, 3 = partial, 4 = minimal, 5 = bad/none

TABLE 3

Visual and tactile comparison of invention settings/formulations with conventional organopanels

| Test # | Composite | Maleic anhydride concentration (wt %) | Surface finish* | Printability with 45 mdyne ink** | Transparency (%) |
|---|---|---|---|---|---|
| 1 (comp.) | A1 + B1 | 0 | 2 | 1 | 1 |
| 2 (comp.) | A1 + B1 | 0 | 2 | 1 | 3 |
| 3 | A2 + B1 | 1 | 1-2 | 1 | 40 |
| 4 | A3 + B1 | 0.66 | 1-2 | 1 | 25 |
| 5 | A4 + B1 | 0.33 | 1-2 | 1 | 20 |
| 6 | Bond laminates composite from ca. 60% glass fiber weave and 40% polyamide | 0 | 4-5 | 1 | 0 |
| 7 | Composite from ca. 60% glass fiber weave and 40% polypropylene | 0 | 4-5 | 5 | 0 |

*1 = completely smooth, 2 = substantially smooth, 3 = slightly rough, 4 = moderately rough, 5 = fibers are distinctly noticeable to the touch
**1 = perfect, 2 = good, 3 = partial, 4 = minimal, 5 = bad/none Test #6

The results are shown in Table 5. The combinations and parameter settings used in connection with test #6 are listed in the table which follows:

TABLE 4

Production conditions for fiber composite materials W

| Test # | Composite* | Temperature profile | Molding pressure (bar) | Pressing time (s) | Thickness (mm) |
|---|---|---|---|---|---|
| 4 | A1 + B1 | 220-240-300-160-80 | 20 | 20 | 1 |
| 12 | A3 + B1 | 220-240-300-160-80 | 20 | 20 | 1 |
| 28 | A1 + B2 | 240-300-320-160-80 | 20 | 20 | 1 |
| 26 | A3 + B2 | 240-300-320-160-80 | 20 | 30 | 1 |

*Components A + B1: 0.465 mm thickness textile construction, 0.653 mm thickness matrix construction, total volume matrix: 22 ml, fiber volume fraction: 41.6%, overall density of semi-finished product: 1.669 g/ml, overall thickness of semi-finished product: 1.117 mm

TABLE 5

Comparison of flexural strength.

| | Test # | | | | | |
|---|---|---|---|---|---|---|
| | 8 | 9 | | 10 | 11 | |
| Reinforcement | NCF (B1), warp direction | | Delta (%) | 2/2 twill weave (B2) | | Delta (%) |
| Matrix | A1 | A3 | | A1 | A3 | |
| | Bending test: | | | | | |
| Modulus (GPa) | 19.7 | 22.5 | 14 | 21.1 | 19.6 | −7 |
| Breaking stress (MPa) | 211 | 462 | 119 | 423 | 528 | 25 |

Table 5 shows the fiber composite materials W obtained in a test series. In each case, a purely SAN copolymer (A1) and an S/AN/maleic anhydride copolymer (A2) were combined with a commercially available noncrimp and woven fabric reinforcement in an identical process and tested. The fiber volume content of the composites was 42%. The improved quality of impregnation and bonding between fiber and matrix shows itself not in the flexural stiffness, but significantly in the flexural strength (breaking stress) of the samples tested.

Test #7

The results are shown in Table 6.

TABLE 6

Comparison of total waviness profile height Wt.

| | Test # | | |
|---|---|---|---|
| | 12 | 13 | 14 |
| | Reinforcement fiber (B3) | | |
| | Matrix (A4) | | |
| | SAN | PC OD | PA6 |
| mean Wt (μm) | 5.2 | 11.7 | 12.3 |
| maximum Wt (μm)) | 7.8 | 22.3 | 17.2 |

The components involved here are defined as follows:
SAN: SAN-MA terpolymer, weight composition (wt %): 73/25/2, Mw: 250 000 g/mol (measured via gel permeation chromatography on standard columns with monodisperse polystyrene standards), MVR: 15-25 cm$^3$/10 min at 220° C./10 kg (ISO1133), viscosity number (in DMF) J=61-67 ml/g
PC OD: easy flowing, amorphous polycarbonate of optical grade for optical disks
PA6: partly crystalline, easy flowing nylon-6
Fibers (B3): 2/2 twill glass fiber weave (GF-KG) of basis weight=300 g/m$^2$, weft+warp=320 tex As is clear from Table 6, the use of SAN-MA terpolymer is particularly advantageous to obtain a low level of total waviness profile height on the surface. PC OD proved sensitive to stress cracking.

Examples of Multilayer Organopanels

The fiber composite materials described (organopanels), especially those comprising an amorphous, thermoplastic matrix, are very useful for producing transparent and translucent moldings, sheets and coatings. Some examples are shown hereinafter. Unless otherwise stated, the shaped articles are produced in injection molding processes.

Example 1

Production of Fiber Composite Material M 40 wt %, based on the fiber composite material of an acrylonitrile-styrene maleic anhydride copolymer in the form of a thermoplastic molding composition A (prepared from: 75 wt % of styrene, 24 wt % of acrylonitrile and 1 wt % of maleic anhydride) is compounded with 60 wt %, based on the fiber composite material, of a glass-based reinforcing fiber having chemically reactive functionality (silane groups) at the surface [GW 123-580K2 from P-D Glasseiden GmbH].

Example 2

Production of Fiber Composite Material N 65 wt %, based on the fiber composite material of an acrylonitrile-butadiene-styrene copolymer in the form of a thermoplastic molding composition A (ABS prepared from: 45 wt % of butadiene, 30 wt % of styrene, 24 wt % of acrylonitrile and 1 wt % of maleic anhydride) is compounded with 35 wt %, based on the fiber composite material of a glass-based reinforcing fiber having chemically reactive functionality (silane groups) at the surface [GW 123-580K2 from P-D Glasseiden GmbH]. The fiber composite material is subsequently subjected to ribbing.

Example 3

Production of Shaped Articles from Fiber Composite Materials M and N

Example A: Washing machine windows

Example B: Lens covers

Enhanced stiffness is observed for the window and the lens cover versus corresponding materials consisting of glass. The organopanels are further less sensitive to scratches and pressure.
Further Bending Stress Tests on Fabric-reinforced Fiber Composite Materials
The components are as defined above. The bending stress and the flexural modulus were determined to DIN 14125: 2011-05. The combinations and parameter settings of the method described in claim 1 are listed in the table which follows:

TABLE 7

Compositions Comp. 1, Comp. 2, Comp. 10 and Comp. 15 and invention compositions V3 to V9 and V11 to V14.
X: weight ratio of components A: B = 60 : 40

| #. | A1 | A2 | A3 | A4 | B1 | B2 | T [° C.] | t [s] |
|---|---|---|---|---|---|---|---|---|
| Comp. 1 | X | | | | X | | 260 | 20-30 |
| Comp. 2 | X | | | | X | | 300 | 30-30 |
| V3 | | X | | | X | | 280 | 20-30 |
| V4 | | X | | | X | | 280 | 40 |
| V5 | | X | | | X | | 320 | 30-30 |
| V6 | | | X | | X | | 300 | 20-30 |
| V7 | | | X | | X | | 320 | 20-30 |
| V8 | | | | X | X | | 310 | 20-30 |
| V9 | | | | X | X | | 320 | 20-30 |
| Comp. 10 | X | | | | X | | 320 | 20-30 |
| V11 | | X | | | X | | 320 | 20-30 |
| V12 | | X | | | | X | 320 | 20-30 |
| V13 | | | X | | | X | 320 | 20-30 |
| V14 | | | | X | | X | 320 | 20-30 |
| Comp. 15 | X | | | | | X | 320 | 20-30 |

The conditions under which the tests were carried out are reported in Table 7.
The starting materials, the temperature and the pressing time were varied. The molding pressure was about 20 bar in all test series.

TABLE 8

Mean maximal bending stress - warpways and weftways - of organopanels produced as per mixtures Comp. 2, V5, V7, V9, Comp. 10, V12 to V14 and Comp. 15, the production temperature being at least 300° C. in each case.

| #. | Fiber direction | Mean maximal bending stress [MPa] |
|---|---|---|
| Comp. 2 | warpways | 211.23 |
| | weftways | 184.94 |
| V5 | warpways | 670.48 |
| | weftways | 271.05 |
| V7 | warpways | 590.98 |
| | weftways | 301.21 |

TABLE 8-continued

Mean maximal bending stress - warpways and weftways - of organopanels produced as per mixtures Comp. 2, V5, V7, V9, Comp. 10, V12 to V14 and Comp. 15, the production temperature being at least 300° C. in each case.

| #. | Fiber direction | Mean maximal bending stress [MPa] |
|---|---|---|
| V9 | warpways | 371.73 |
| | weftways | 244.62 |
| Comp. 10 | warpways | 319.8 |
| | weftways | 236.01 |
| V12 | warpways | 556.15 |
| | weftways | 484.24 |
| V13 | warpways | 528.96 |
| | weftways | 386.83 |
| V14 | warpways | 513.95 |
| | weftways | 413.86 |
| Comp. 15 | warpways | 423.03 |
| | weftways | 301.40 |

The means reported in Table 8 are computed from nine measurements each.
Table 8 shows that the organopanels which are in accordance with the present invention—V5, V7, V9, V12, V13 and V14—have a higher mean maximal bending stress than the organopanels comprising a matrix containing 75 wt % of styrene (S) and 25 wt % of acrylonitrile (AN): Comp. 10 and Comp. 15. The comparison of V9 with Comp. 10 likewise shows that—under the same conditions (T=320° C. and t=30 s)—the organopanel of the present invention has a higher bending stress both warpways and weftways.
It transpires that the method of producing the fiber composite material delivers improved products with a thermoplastic molding composition A, reinforcing fibers B.
Further Investigation of Multilayered Fiber Composite Materials
Technical Data of Interval Hot Press (IVHP):
Quasi-continuous production of fiber-reinforced thermoplastic semi-finished products, laminates and sandwich plates
Plate width: 660 mm
Laminate thickness: 0.2 to 9.0 mm
Laminate tolerances: max. ±0.1 mm, similar for semi-finished product
Sandwich plate thickness: max. 30 mm
Output: about 0.1-60 m/h, depending on quality and component part thickness
Nominal speed of advance: 5 m/h
Mold pressure: press unit 5-25 bar, continuously adjustable (optional) for minimum and maximum tool size
Mold temperature regulation: 3 heating and 2 cooling zones
Mold temperature: up to 400° C.
Mold length: 1000 mm
Press opening stroke: 0.5 to 200 mm
Manufacturing direction: right to left
Technical Data of Melt Plastication:
Batchwise melt application in midply for production of fiber-reinforced thermoplastic semi-finished products
Screw diameter: 35 mm
Max. swept volume: 192 cm$^3$
Max. screw speed: 350 rpm
Max. output stream: 108 cm$^3$/s
Max. output pressure: 2406 bar specific herein:
Melt volume: 22 ccm
Isobaric=pressure-controlled molding process Isochoric=volume-controlled molding process T [° C.]=temperature of temperature zones* (*The press has 3 heating and 2 cooling zones. Reported in manufacturing direction)

p [bar]=molding pressure per cycle: isochoric 20 s [mm]=pressed thickness path limitation: 1.1 mm

Temperature profile: (i) 210 to 245° C., hence about 220° C.

(ii) 300 to 325° C., hence about 300° C.
(iii) 270 to 320° C., hence about 280 to 320° C.
(iv) 160 to 180° C.
(v) 80° C.

t [sec]=pressing time per cycle: 20-30 s

Construction/lamination: 6-ply construction with melt midlayer; production method: melt direct (SD)

Matrix Components A:

M1 (SAN type): styrene-acrylonitrile maleic anhydride (SAN-MA) terpolymer (S/AN/MA: 74/25/1) with an MA fraction of 1 wt % and an MVR of 22 $cm^3$/10 min at 220° C./10 kg (measured to ISO1133);

M1b corresponds to the aforementioned component M1 except that the matrix was additionally admixed with 2 wt % of carbon black.

M2 (SAN type): styrene-acrylonitrile maleic anhydride (SAN-MA) terpolymer (S/AN/MA: 73/25/2.1) with an MA fraction of 2.1 wt % and an MVR of 22 $cm^3$/10 min at 220° C./10 kg (measured to ISO1133);

M2b corresponds to the aforementioned component M1 except that the matrix was additionally admixed with 2 wt % of carbon black.

M3 (SAN type): Blend of 33 wt % M1 and 67 wt % of Luran VLN SAN copolymer, hence 0.33 wt % of maleic anhydride (MA) in the entire blend;

M3b corresponds to the aforementioned component M3 except that the matrix was additionally admixed with 2 wt % of carbon black.

PA6: partly crystalline, easy flowing Durethan B30S nylon

PD(OD): easy flowing, amorphous polycarbonate of optical grade for optical disks;

Fiber Components B:

Glass filament twill weave (codes: GF-KG(LR) or LR), twill construction 2/2, basis weight 290 g/$m^2$, roving EC9 68 tex, finish TF-970, delivered width 1000 mm (type: 01102 0800-1240; manufacturer: Hexcel, obtained from: Lange+ Ritter)

Glass filament twill weave (codes: GF-KG(PD) or PD), twill construction 2/2, basis weight 320 g/$m^2$, roving 320 tex, finish 350, delivered width 635 mm (type: EC14-320-350, manufacturer and supplier: PD Glasseide GmbH Oschatz)

Glass filament noncrimp fabric (code: GF-GE(Sae) or Sae) 0°/45°/90°/−45°, basis weight 313 g/$m^2$, main roving 300 tex, finish PA size, delivered width 655 mm (type: X-E-PA-313-655, #7004344, manufacturer and supplier: Saertex GmbH&Co.KG)

Sae n.s.=glass filament noncrimp fabric 300 g/$m^2$, manufacturer's designation: Saertex new sizing, +45°/−45°/+45°/−45°

Glass fiber web (code: GV50), basis weight 50 g/$m^2$, fiber diameter 10 μm, delivered width 640 mm (type: Evalith S5030, manufacturer and supplier: Johns Manville Europe)

Visual Assessment

All the fiber composite materials produced are each obtainable as large-area flat organopanels in a continuous process, which were readily cuttable to size (into laminatable transportable dimensions such as, say, 1 m×0.6 m). In the transparent fiber composite materials, the embedded fiber material was just about recognizable on detailed inspection against the light. With the fiber composite materials having a (black) stained matrix, the embedded fiber material could barely be made out, if at all, even on closer visual inspection against the light.

Microscopic Assessment

Defects (voids, sink marks, etc.) were assessed via reflected light microscopy, while surface finish was assessed via confocal laser scanning microscopy (LSM). LSM was used to establish a plan view of a three-dimensional (3D) contour picture (7.2 mm×7.2 mm) of the local region measured and a two-dimensional (2D) representation of the height differences after scaling and applying various profile filters. Experimental errors and any general distortion/skewness of the sample were eliminated by the employment of profile filters (noise filter and tilt filter). The 2D height profile of the picture was transferred into line profiles, via defined measuring lines and through integrated software, and evaluated with computer support.

The fiber composite materials produced each had four plies of the corresponding fabric of fibers (here GF-KG(PD) (4) or Sae(4)) embedded in the particular matrix. To further improve the comparability of the samples, a thin glass fiber web (GV50, see above) was applied to each of the fiber composite materials obtained, on both sides. This web had no significant influence on the mechanical properties.

The mean total waviness profile height (mean Wt) and the arithmetical mean roughness value (Ra) were determined for numerous fiber composite materials. It transpired that mean Wt is distinctly <10 μm for all fiber composite materials wherein the matrix contains a functional component capable of reacting with the fibers, whereas it is distinctly <10 μm with fiber composite materials having comparable PA6 and PD(OD) matrices. The arithmetical mean roughness values determined were also distinctly lower for fiber composite materials that are in accordance with the present invention. The measured values below show this by way of example.

TABLE 9

Measured results of LSM measurement with SAN matrix system—total waviness profile height (Wt) and arithmetical mean roughness value (Ra)

| | SAN(1) | | | | PC(1) | PA6(1) |
|---|---|---|---|---|---|---|
| | Constitution +GF-KG(PD)(4) Components | | | | | |
| | M1b + PD | M2 + PD | M2b + PD | M3b + PD | PC(OD) + PD | PA6 + PD |
| mean Wt | 7.141 | 7.187 | 5.181 | 5.425 | 11.745 | 12.323 |
| mean Ra | 3.995 | 4.415 | 4.17 | 3.451 | 6.406 | 4.968 |

This became similarly clear on using a noncrimp fabric (such as Sae) instead of the woven fabric:

TABLE 10

Measured results of LSM measurement with SAN matrix system - total waviness profile height (Wt) and arithmetical mean roughness value (Ra)

|  | Constitution | | |
|---|---|---|---|
|  | SAN(1) Constitution +Sae(4) Components | | PA6(1) |
|  | M1b + Sae | M2b + Sae |  |
| mean Wt | 5.535 | 5.205 | 17.05 |
| mean Ra | 4.261 | 4.24 | 4.861 |

Further tests were carried out to investigate the strength separately in the warp direction and in the weft direction. It was found that the fiber composite materials are very stable not only warpways but also weftways. Warpways the fiber composite materials are generally more stable than in the weft direction.

Mechanical Properties

Matrix Components A

Matrix components A are as described above.

Fiber Components B (Where not Described Above)

FG290=woven glass filament fabric 290 g/m², manufacturer's designation: Hexcel HexForce® 01202 1000 TF970

FG320=woven glass filament fabric 320 g/m², manufacturer's designation: PD Glasseide GmbH Oschatz EC14-320-350

Sae=MuAx313, noncrimp glass filament fabric 300 g/m², manufacturer's designation: Saertex X-E-PA-313-655

Sae n.s.=noncrimp glass filament fabric 300 g/m², manufacturer's designation: Saertex new sizing, +45°/−45°/+45°/−45°

Number of layers (e.g., 4×=four layers of the particular fiber NCF or the particular fibers)

The transparent fiber composite materials, into each of which a flat fibrous material was imported, were produced as follows. The fiber composite materials produced each had a thickness of about 1.1 mm. To further improve the comparability of the samples, a thin glass fiber web (GV50, see above) was applied to each of the fiber composite materials obtained, on both sides. This web has no significant influence on the mechanical properties or visual properties. The following flexural strengths to DIN EN ISO 14125 were determined for the samples:

TABLE 11

Transparent fiber composite materials—flexural strength

| # | Constitution | Glass content [g/m²] | Matrix | Thickness [mm] | Elastic modulus | Flexural strength |
|---|---|---|---|---|---|---|
| F/T_1 | 4xFG290 | 1260 | M2 | 1.09 | 18.41 | 658.89 |
| F/T_2 | 4xFG320 | 1380 | M2 | 1.09 | 18.17 | 634.32 |
| F/T_3 | 4xSae | 1352 | M2 | 1.16 | 18.44 | 444.33 |
| F/T_4 | Sae n.s. |  | M2 | 1.17 | 15.93 | 621.04 |
| F/T_5 | 4xFG320 | 1380 | PC(OD) | 1.14 | 23.36 | 377.97 |

Also produced were the following black-stained fiber composite materials in each of which the matrix was admixed with 2 wt % of carbon black and into each of which flat fibrous material was imported. The fiber composite materials produced each had a thickness of about 1.1 mm. To further improve the comparability of the samples, a thin glass fiber web (GV50, see above) was applied to each of the fiber composite materials obtained, on both sides. This web has no significant influence on the mechanical properties or visual properties. The following flexural strengths to DIN EN ISO 14125 were determined for the samples:

TABLE 12

Nontransparent fiber composite materials—flexural strength

| # | Constitution | Glass content [g/m²] | Matrix | Thickness [mm] | Elastic modulus | Flexural strength |
|---|---|---|---|---|---|---|
| F/S_1 | 4xFG290 | 1260 | M2 | 1.07 | 21.61 | 661.73 |
| F/S_2 | 4xFG320 | 1380 | M2 | 1.20 | 22.70 | 673.99 |
| F/S_3 | 4xSae | 1352 | M2 | 1.15 | 14.92 | 385.21 |
| F/S_4 | 4xSae | 1352 | PA6 | 1.13 | 14.30 | 477.77 |
| F/S_5 | 4xFG320 | 1380 | PA6 | 1.11 | 16.95 | 471.97 |

It transpired, in summary, that the wovens used (FG290 and FG320) are processable into fiber composite materials having particularly high flexural strength. The fiber composite materials of the present invention, wherein the matrix contains a component (here: maleic anhydride (MA)) which reacts with the fibers, have a significantly higher flexural strength than the comparative molding compositions without such a component, such as PC(OD) or PA6.

By contrast, Luran 378P G7 fiber composite material reinforced with chopped glass fibers, which is not in accordance with the present invention, merely gave a flexural strength of 150 MPa, hence a distinctly lower flexural strength.

In addition, the fiber composite materials were tested for impact toughness and/or penetration resistance (Dart Test to ISO 6603). Again, the fiber composite materials exhibited a high stability of Fm >3000 N.

Optional Further Processing

It was also shown experimentally that the fiber composite materials obtained were readily formable into three-dimensional semi-finished products, for example into semi-finished half-shell products. It further transpired that the fiber composite materials obtained were printable and laminatable.

Summary of Experimental Results

The evaluation of different textile systems based on glass fiber with different matrix systems into a fiber composite material (organopanel) showed that good fiber composite materials are reproducibly obtainable (as organopanels and semi-finished products derived therefrom). These are obtainable in colored or colorless form. The fiber composite materials exhibited good to very good visual, tactile and mechanical properties (regarding their flexural strength and penetration resistance for example). Mechanically, the woven fabrics exhibited somewhat greater strength and stiffness than noncrimp fabrics. The styrene-copolymer-based matrices (SAN matrices) tended to lead to better fiber composite materials regarding mechanical characteristics than the alternative matrices such as PC and PA6. The fiber composite materials of the present invention were obtainable semi-automatically or fully automatically via a continuous process. The fiber composite materials (organopanels) of the present invention are three-dimensionally formable into semi-finished products in an efficient manner.

What is claimed is:

1. A fiber composite material W comprising:
   (A) a polymer matrix in the form of a thermoplastic polymer composition A comprising:
      (A1) at least one copolymer C comprising monomers A-I and monomers A-II and optionally further monomers, wherein monomers A-I are selected from the group consisting of maleic anhydride (MA), N-phenylmaleimide (PM), tert-butyl (meth)acrylate, and glycidyl (meth)acrylate (GM);
      (A2) optionally one or more dyes F; and
      (A3) optionally one or more assistants H; and
   (B) glass fibers B whose surface displays functional groups B-I which form a covalent bond with said monomers A-I, but not with said monomers A-II,
      wherein the light transmission through said fiber composite material W is not less than 10% higher than with a comparable fiber composite material that has the same structural properties as fiber composite material W except that monomers A-II fully replace said monomers A-I, and
      wherein optionally the flexural strength of said fiber composite material W is not less than 20% higher than with a comparable fiber composite material that has the same structural properties as fiber composite material W except that monomers A-II fully replace said monomers A-I.

2. The fiber composite material W as claimed in claim 1 wherein said fiber composite material W consists of:
   20-99.5 wt % of the thermoplastic polymer composition A;
   0.5-80 wt % of the glass fibers B; and also
   0-79.5 wt % of polymer D.

3. The fiber composite material W as claimed in claim 1 wherein said copolymer C comprises not less than 0.1 wt % of monomers A-I.

4. The fiber composite material W as claimed in claim wherein said thermoplastic polymer composition A comprises not less than 90 wt % of said copolymer C.

5. The fiber composite material W as claimed in claim 1 wherein said copolymer C is a styrene copolymer C comprising styrene (S) as monomers A-II.

6. The fiber composite material W as claimed in claim 1 wherein said functional groups B-I at the surface of said glass fibers B are selected from the group consisting of hydroxyl groups, ester groups, and amino groups.

7. The fiber composite material W as claimed in claim 1 wherein said glass fibers B embed into said fiber composite material W layerwise.

8. The fiber composite material W as claimed in claim 1 wherein:
   (A) said polymer matrix A comprises not less than 75 wt % of styrene copolymer C, maleic anhydride (MA) as monomers A-I, and styrene (S) as monomers A-II; and
   (B) said glass fibers B are glass fibers displaying hydroxyl groups in the form of silanol groups as functional groups B-I on the surface,
      wherein the MA moieties are at least partly esterified with the silanol groups on the surface of said glass fibers B.

9. The fiber composite material W as claimed in claim 1 wherein the light transmission through said fiber composite material W is not less than 15% higher than with a comparable fiber composite material that has the same structural properties as fiber composite material W except that monomers A-II fully replace said monomers A-I.

10. The fiber composite material W as claimed in claim 1 wherein the flexural strength of said fiber composite material W is not less than 20% higher than with a comparable fiber composite material that has the same structural properties as fiber composite material W except that monomers A-II fully replace said monomers A-I.

11. The fiber composite material W as claimed in claim 1 wherein no adhesion promoter from the group consisting of aminosilanes and epoxy compounds was used in the production of said fiber composite material W.

* * * * *